United States Patent
Simms et al.

(10) Patent No.: US 12,496,944 B2
(45) Date of Patent: Dec. 16, 2025

(54) LATCH FOR LOCKING VEHICLE SEAT BACK

(71) Applicant: TS TECH CO., LTD., Asaka (JP)

(72) Inventors: Andrew J. Simms, Royal Oak, MI (US); Justin Schrand, Ferndale, MI (US); Dean Vandenheede, Franklin, MI (US)

(73) Assignee: TS TECH CO., LTD., Saitama (JP)

( * ) Notice: Subject to any disclaimer, the term of this patent is extended or adjusted under 35 U.S.C. 154(b) by 187 days.

(21) Appl. No.: 18/553,031

(22) PCT Filed: Mar. 28, 2022

(86) PCT No.: PCT/JP2022/014973
§ 371 (c)(1),
(2) Date: Sep. 28, 2023

(87) PCT Pub. No.: WO2022/210528
PCT Pub. Date: Oct. 6, 2022

(65) Prior Publication Data
US 2024/0181944 A1  Jun. 6, 2024

Related U.S. Application Data

(60) Provisional application No. 63/167,333, filed on Mar. 29, 2021, provisional application No. 63/167,342, filed on Mar. 29, 2021.

(51) Int. Cl.
*B60N 2/36* (2006.01)
*B60N 2/22* (2006.01)
(52) U.S. Cl.
CPC ........... *B60N 2/366* (2013.01); *B60N 2/2245* (2013.01)

(58) Field of Classification Search
CPC ....... B60N 2/933; B60N 2/366; B60N 2/2245
(Continued)

(56) References Cited

U.S. PATENT DOCUMENTS 4,636,005 A * 1/1987 Bolz ..................... B60N 2/366
297/DIG. 2
6,733,078 B1   5/2004 Zelmanov
(Continued)

FOREIGN PATENT DOCUMENTS

JP   2016215995 A   12/2016
JP   2018052395 A    4/2018
(Continued)

OTHER PUBLICATIONS

International Search Report issued for International Patent Application No. PCT/JP2022/014973, Date of mailing: Jun. 14, 2022, 5 pages including English translation.
(Continued)

*Primary Examiner* — Milton Nelson, Jr.
(74) *Attorney, Agent, or Firm* — HSML P.C.

(57) ABSTRACT

A latch including a frame having a receiving groove in which a striker is receivable, and a hook rotatably supported by the frame, the hook having an engaging groove with which the striker is engageable. The engaging groove is a single groove having a first groove part extending from a part of an outer edge of the hook and a second groove part bent from the first groove part and extending in a direction different from a direction the first groove part extends. When the seat back is in the raised position, the hook is in a first position and the striker is in the first groove part, and when the seat back is in the reclining position, the hook is in a second position that is a position of the hook rotated in a first direction from the first position and the striker is in the second groove part.

6 Claims, 20 Drawing Sheets

(58) Field of Classification Search
USPC .................................................. 297/378.13
See application file for complete search history.

(56) References Cited

U.S. PATENT DOCUMENTS

| | | | |
|---|---|---|---|
| 6,769,741 B2* | 8/2004 | Denning | B60N 2/2245 |
| | | | 297/378.13 |
| 7,762,604 B1* | 7/2010 | Lindsay | B60N 2/01583 |
| | | | 296/65.09 |
| 9,994,129 B1 | 6/2018 | Shirokane | |
| 11,167,670 B1 | 11/2021 | Hunt et al. | |
| 11,554,702 B2 | 1/2023 | Sayama | |
| 2020/0001763 A1 | 1/2020 | Sayama | |

FOREIGN PATENT DOCUMENTS

| | | |
|---|---|---|
| JP | 2019131100 A | 8/2019 |
| WO | 2022023832 A1 | 2/2022 |

OTHER PUBLICATIONS

Written Opinion issued for International Patent Application No. PCT/JP2022/014973, Date of mailing: Jun. 14, 2022, 6 pages including English translation.

Extended European Search Report issued for European Patent Application No. 22780739.3, dated Sep. 2, 2024, 7 pages.

* cited by examiner

LATCH FOR LOCKING VEHICLE SEAT BACK

TECHNICAL FIELD

The present disclosure relate to a latch used in a seat back and the like.

BACKGROUND ART

A latch capable of locking a seat back of a vehicle in two positions, i.e., can be raised higher to a raised position in which the luggage space is maximized, and can be inclined back from the raised position to a reclining position in which the occupant may be made more comfortable is conventionally known. The latch comprises a hook that engages with a striker fixed to the vehicle. The hook has two grooves for engaging with the striker when the seat back is in the two positions, the raised position and the reclining position.

CITATION LIST

Patent Literature

Patent Document 1: JP2018-052395A

SUMMARY OF INVENTION

In the aforementioned technical scheme, when a state of the latch is shifted from a state in which the striker is not engaged with the hook to a state in which the striker is engaged with a first groove corresponding to the raised position, the hook temporary rotates in one direction. To cause the seat back to move from the raised position and get located in the reclining position, the hook is caused to rotate again in the same direction and the seat back is moved rearward, and the hook is caused to rotate reversely back to its engaged position. On this occasion, the striker is engaged into the second groove after being disengaged from the first groove, and therefore the hook and the striker may not be smoothly engaged depending on the position of the seat back and the timing of the reverse rotation of the hook.

It is an object of the present disclosure to provide a latch capable of smoothly locking the striker at two positions.

A latch, as contrived for achieving the aforementioned object, locks the seat back at two positions: a raised position and a reclining position more inclined to the rear than the raised position. The latch comprises a frame having a receiving groove capable of receiving the striker, and a hook rotatably supported by the frame having an engaging groove to which the striker engages.

The engaging groove is a single groove consisting of a first groove part extending from a part of the outer edge of the hook, and a second groove part bent from the first groove part and extending in a direction different from a direction in which the first groove part extends. The latch is configured such that, when the seat back is in the raised position, the hook is located in a first position and the striker is located in the first groove part, and when the seat back is in the reclining position, the hook is located in a second position that is a position of the hook rotated in a first direction from the first position and the striker is located in the second groove part.

With this configuration, the striker is located in the first groove part when the hook is in the first position, and the striker is located in the second groove part when the hook is in the second position. Thus, the striker stays engaged in the engaging groove while the seat back is being moved from the raised position to the reclining position, so that the striker can be smoothly locked in the two positions. Since the second groove part extends in the direction different from the direction the first groove part extends, the engaging groove can be easily positioned to cross the receiving groove in both the situations: when the hook is in the first position and when the hook is in the second position.

The second groove part may be closer, than the first groove part, to the rotational axis of the hook.

With this configuration, the striker can be smoothly moved relative to the hook between the state in which the striker is engaged in the second groove part and the state in which the striker is engaged in the first groove part.

The latch may further comprise a shaft that connects the hook to the frame in such a manner that the hook is rotatable. In this instance, the shaft is shifted relative to the receiving groove in one direction that is a direction perpendicular to a direction in which the receiving groove extends.

With this configuration, the hook can be rotated by the striker by pressing the striker in the receiving groove against the hook.

The latch may further comprise a lock member that prevents rotation of the hook located in the first position. The lock member incudes a first lock cam rotatably supported by the frame and preventing a rotation of the hook in the second direction opposite to the first direction, and a second lock cam preventing a rotation of the hook in the first direction.

With this configuration, when the striker is engaged in the first groove part of the hook located in the first position, both the rotation of the hook in the first direction and the rotation of the hook in the second direction can be prevented.

The first lock cam may also be configured to prevent the hook located in the second position from rotating in the second direction.

The latch may further comprise an interlocking link that synchronizes the rotation of the first lock cam and rotation of the second lock cam, the interlocking link rotatable coaxially about a same axis as an axis of rotation of the first lock cam, and connected to the second lock cam.

With this configuration, the second lock cam can be moved synchronously with the first lock cam.

The hook is capable of moving to an open position that is a position of the hook rotated from the first position in the second direction. The first lock cam may include a contact portion that contacts the hook in the open positions and prevents the rotation of the hook in the first direction.

In the conventional technical scheme, the hook in the lock state may be shaken due to the vibration of the vehicle, resulting in undesirable unlocking and/or production of noises.

Thus, a latch that restrains shaking of the hook is provided in the present disclosure.

A latch as contrived for restraining a play of the hook is a latch for locking the seat back in two positions: the raised position and the reclining position in which the seat back is inclined rearward further than in the raised position. The latch comprises: a frame having a receiving groove capable of receiving the striker; a hook having a first engaging groove in which the striker is engagable and a second engaging groove in which the striker is engageable, the second engaging groove being located at a position different from a position of the first engaging groove, which first and second groove crosses the receiving groove, the hook being capable of rotating between an engaging position in which the striker is capable of engaging in at least one of the grooves consisting of the first engaging groove and the second engaging groove, and a non-engaging position in which the hook is retreated from the receiving groove such that the striker is movable inside the receiving groove; a lock cam rotatably supported by the frame, the lock cam configured to contact the hook to prevent the hook from moving toward the non-engaging position when the hook has rotated a predetermined amount from the engaging position to the non-engaging position; and a pressing arm rotatable relative to the lock cam and configured to be pressed against the hook when the hook is in the engaging position.

With this configuration, if the hook is rotated a predetermined amount toward the non-engaging position from the engaging position, contact of the lock cam with the hook can restrain the latch from unlocking. Since the pressing arm is pressed against the hook when the hook is in the engaging position, the loosening of the hook can be restrained. Thus the shaking of the hook such as due to the vibration of the vehicle can be restrained. The shaking of the hook can also be restrained even if the position of the striker relative to the latch varies due to a position error as would be introduced in installation of the striker and the latch.

It is preferable for the latch to further comprise a first spring that biases the pressing arm toward the hook.

By comprising the first spring, the pressing arm can be securely pressed against the hook.

The latch may further comprise a second spring that biases the hook in a direction from the non-engaging position toward the engaging position.

The lock cam is capable of rotating between the lock position in which the hook is prevented from rotating and an unlocked position in which the hook is not prevented from rotating, and the pressing arm can be configured such that when the lock cam moves from the lock position to the unlocked position, the pressing arm rotates together with the lock cam and separates from the hook.

The latch may further comprise an interlocking link that connects the lock cam and the hook in a way that renders the lock cam and the hook synchronously movable, wherein the interlocking link causes the hook to move from the engaging position to the non-engaging position when the lock cam moves from the lock position to the unlocked position.

With this configuration, the hook can be moved from the engaging position to the non-engaging position by moving the lock cam from the lock position to the unlocked position.

The hook may comprise a pin, and the interlocking link may have a long hole in which the pin is engageable.

The pressing arm may be supported by the frame in such a manner that the pressing arm is rotatable coaxially with the lock cam.

DESCRIPTION OF EMBODIMENTS

First Embodiment

Hereinafter, the first embodiment of a vehicle seat will be described with reference to the drawings.

Figure 1:
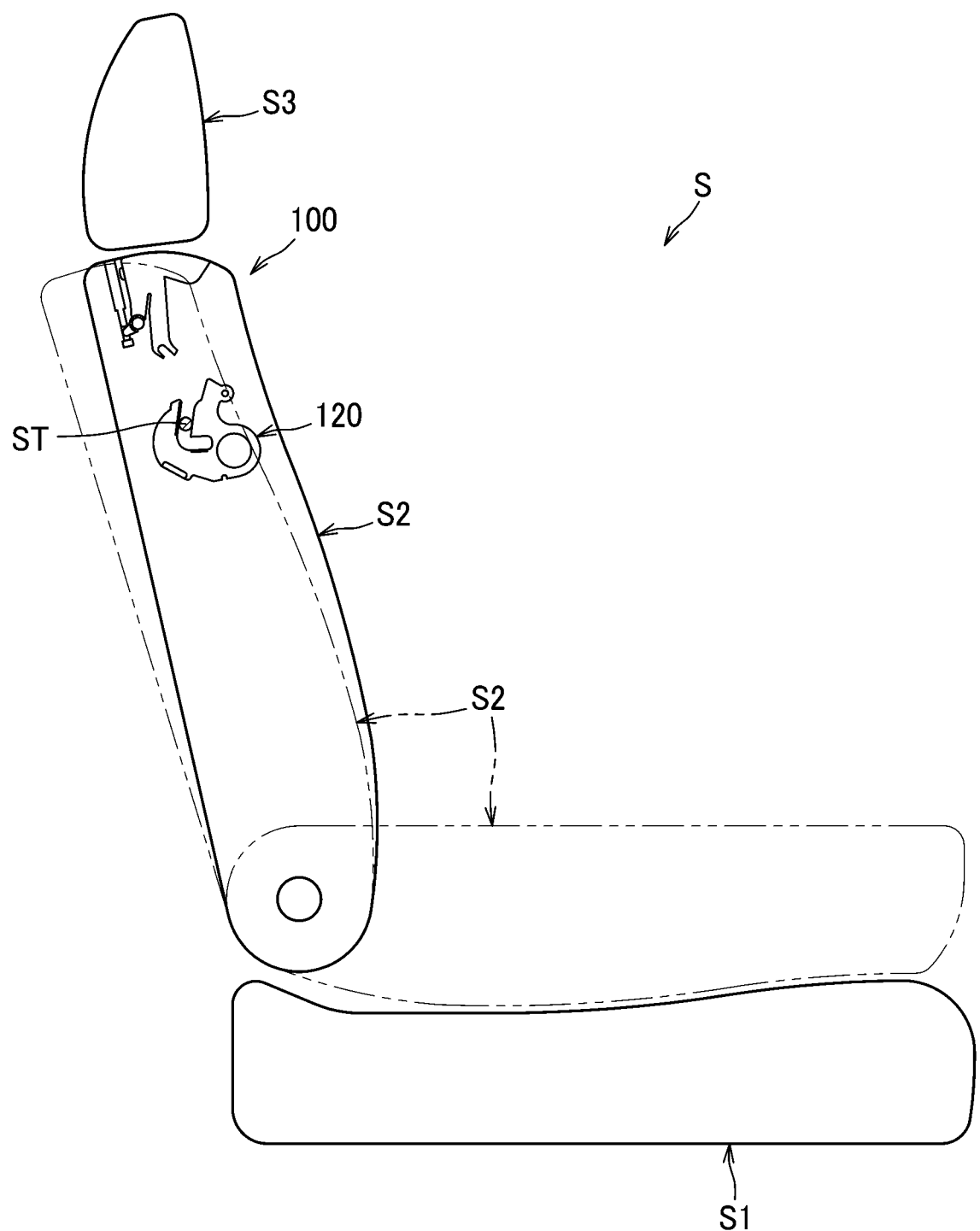
FIG. 1 is a diagram showing a state of a latch attached to a vehicle seat.

As shown in FIG. 1, a latch 100 integrally formed with a lever is used to lock a position of a vehicle seat S. The seat S is, for example, a rear seat of an automobile, and comprises a seat cushion S1, a seat back S2, and a headrest S3. A striker ST having a bar-shaped portion is fixed to a vehicle body of the vehicle. In the present embodiment, the front/rear (frontward/rearward) and up/down (upward/downward; upper/lower) are represented with reference to the seat S in FIG. 1. In other words, in FIG. 1, the right is the front and the left is the rear.

The latch 100 is fixed to the seat back S2. The latch 100 includes a hook 120. The latch 100 locks the position of the seat back S2 by the hook 120 engaging with the striker ST. Specifically, the latch 100 can lock the seat back S2 in two positions; a raised position shown by the solid line and a reclining position shown by the dotted line which reclining position is a position in which the seat back is inclined rearward further than in the raised position. When the latch 100 is in an unlocked state, the seat back S2 may be inclined frontward, and thus the seat back S2 may also be folded on top of the seat cushion S1 as shown by the dotted line.

Figure 2:
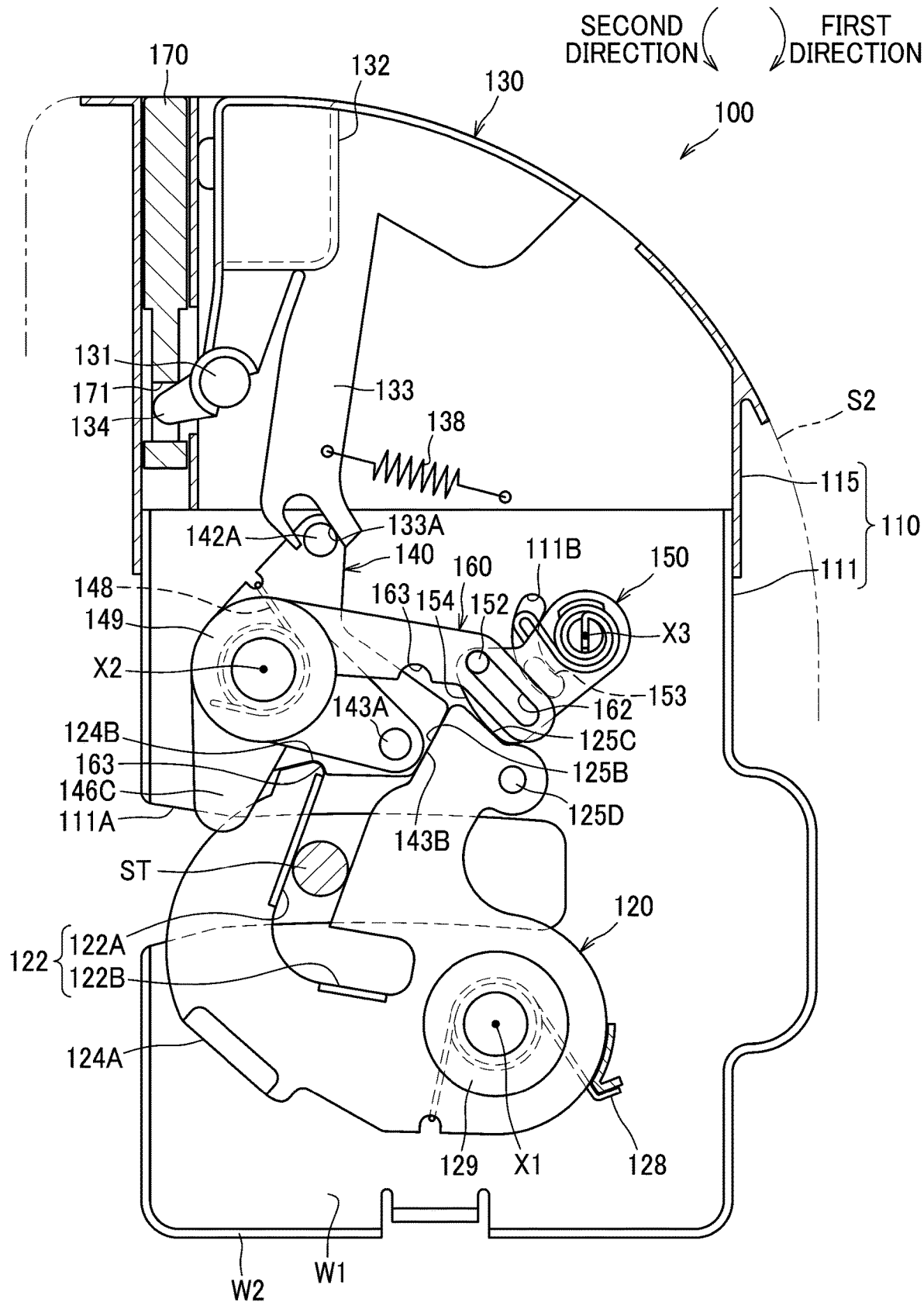
FIG. 2 is a diagram showing a latch of a first embodiment in a first lock position.
Figure 3:
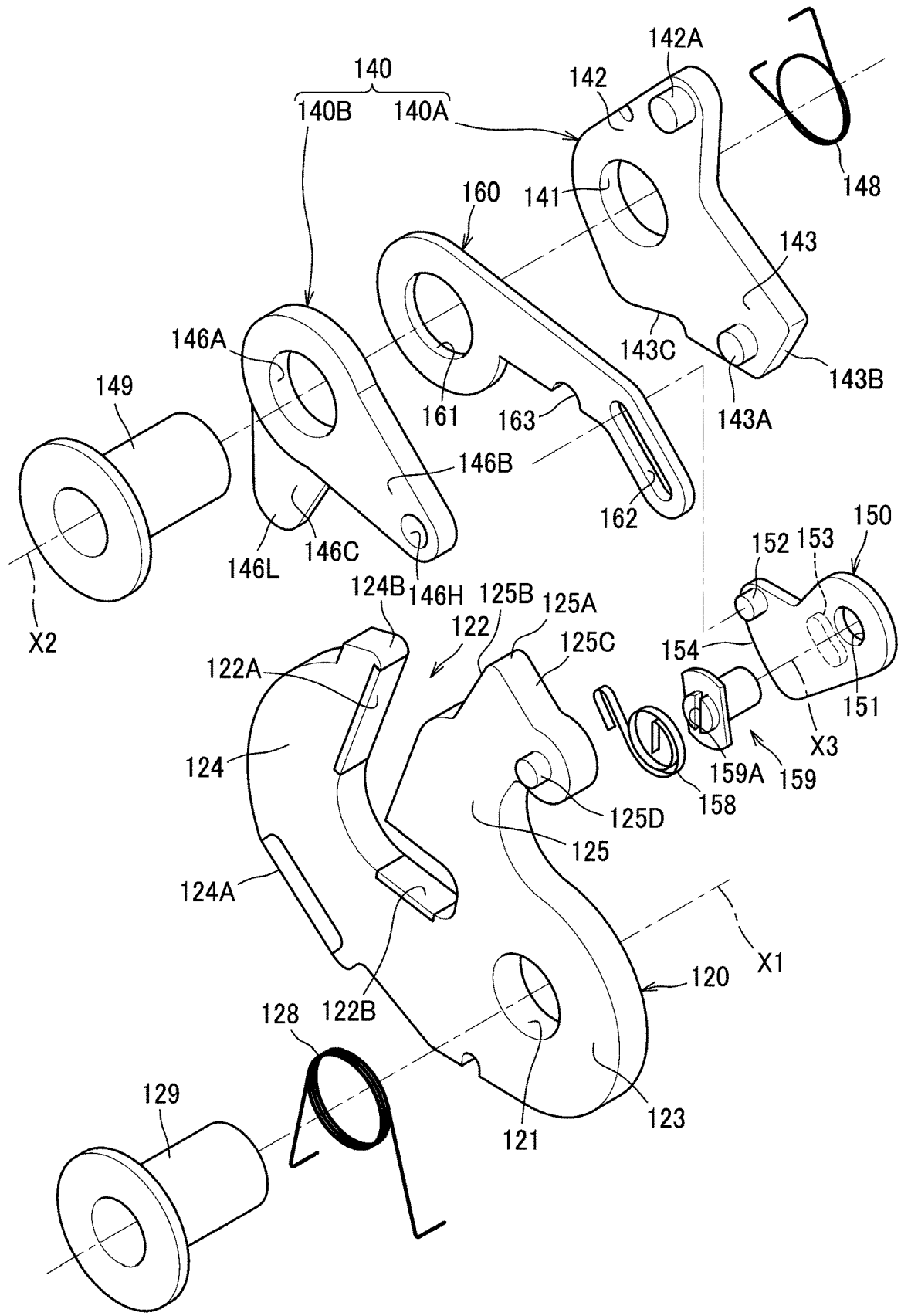
FIG. 3 is an exploded perspective view of the latch of the first embodiment.

As shown in FIG. 2 and FIG. 3, the latch 100 mainly includes a frame 110, a hook 120, a release lever 130, a first lock cam 140 and a second lock cam 150 as a lock member, an interlocking link 160, a flag 170, a shaft 129, and a shaft 149.

The frame 110 includes a main frame 111 supporting the hook 120, the first lock cam 140, and the second lock cam 150, and a lever frame 115 supporting the release lever 130 and the flag 170. The lever frame 115 is fixed to the top of the main frame 111. Though omitted in the figures, the frame 110 is configured to include a cover not shown in the figures and forms a housing comprised of the main frame 111 and the lever frame 115 shown in the figures, and the cover, for stowing each component.

The main frame 111 has a receiving groove 111A capable of receiving the striker ST. The receiving groove 111A extends in an approximately straight line. Specifically, the receiving groove 111A extends in a gentle curve along a segment of a circle the center of which coincides with the rotation axis of the seat back S2. The main frame 111 includes a support wall W1 that supports the hook 120 and other components, and a side wall W2 extending along the outer edge of the support wall W1 in a direction perpendicular to the support wall W1 such that the components are surrounded by the side wall W2. The side wall W2 may be integrally formed with the support wall W1, or may be a member formed of a member other than the support wall W1. For example, the side wall W2 may be formed as a part of the cover to be placed over the support wall W1 to house the components in combination with the support wall W1.

The hook 120 is made of a thick metal plate by press forming. The hook 120 may be covered partially or entirely with plastic, rubber or the like. The hook 120 is rotatably supported by the main frame 111. The hook 120 is rotatable about an axis X1 in a first direction, that is, a clockwise direction in FIG. 2, and a second direction opposite to the first direction. Specifically, the hook 120 can be moved to a first position shown in FIG. 2, rotated in the first direction from the first position to a second position (refer to FIG. 11), and rotated in a second direction from the first position to an open position (refer to FIG. 4).

The hook 120 has an engaging groove 122 in which the striker ST is engageable. The engaging groove 122 is a single groove consisting of a first groove part 122A extending from a part of an outer edge of the hook 120 and a second groove part 122B that is bent from the first groove part 122A and extends in a direction different from a direction in which the first groove part 122A extends. The second groove part 122B is closer, than the first groove part 122A, to the axis X1, i.e. the center of rotation, of the hook 120. The second groove part 122B extends in a direction away from the axis X1 as viewed with a line of sight aligned with the axis X1 (for convenience, with reference to a direction of a radius of a circle the center of which coincides with the axis X1, this direction will be referred to as "radial direction" in the present embodiment). Specifically, the second groove part 122B extends in a direction slightly oblique deviating from the radial direction. The first groove part 122A extends in a direction approximately perpendicular to the second groove part 122B. The second groove part 122B is oblique relative to the radial direction.

The hook 120 includes a bearing part 123, a hook part 124, and an opposed part 125.

The bearing part 123 has a bearing hole 121. The shaft 129 is inserted in the bearing hole 121. The shaft 129 when inserted into the bearing hole 121, is fixed to the main frame 111. The shaft 129 thus connects the hook 120 to the main frame 111 in a manner that permits the hook 120 to rotate. The shaft 129 is located in a position shifted relative to the receiving groove 111A to one side in a direction perpendicular to the direction in which the receiving groove 111A extends (an upward or downward direction in FIG. 2). In the present embodiment, the shaft 129 is located in a position shifted in the downward direction relative to the receiving groove 111A.

The hook part 124 extends from the bearing part 123. The opposed part 125 is a part opposed to the hook part 124 across the engaging groove 122. The hook part 124 includes a contact surface 124A formed as a flat surface at an outer surface facing away from the engaging groove 122. The contact surface 124A determines the position of the hook 120 when the hook 120 is in the open position (refer to FIG. 4), and is a part that the first lock cam 140 contacts to stop the hook 120 from rotating in the second direction when the hook is in the second position (refer to FIG. 11).

The opposed part 125 includes an end portion 125A, a first lock surface 125B, a second lock surface 125C, and a lock protrusion 125D.

The end portion 125A protrudes farther than an end portion 124B of the hook part 124.

The first lock surface 125B is formed in an approximately flat shape. The first lock surface 125B is disposed adjacently to a side of the end portion 125A facing in the second direction. The first lock surface 125B is a surface that the first lock cam 140 contacts to prevent the hook 120 from rotating in the second direction when the hook 120 is located in the first position shown in FIG. 2.

The second lock surface 125C is formed in an approximately flat shape. The second lock surface 125C is disposed adjacently to a side of the end portion 125A facing in the first direction. The second lock surface 125C is a surface that the second lock cam 150 contacts to prevent the hook 120 from rotating in the first direction when the hook 120 is located in the first position.

The lock protrusion 125D protrudes toward one side (the front side of the drawing sheer of FIGS. 2 and 3) in a direction parallel to the axis X1 (hereafter, will be referred to simply as an "axial direction" in the present embodiment). The lock protrusion 125D may be provided by press fitting a pin into the opposed part 125, or may be provided by half blanking a part of the opposing part 125.

The hook 120 is biased in the first direction by a torsion spring 128. One arm of the torsion spring 128 is engaged with the hook 120 and the other arm is engaged with the main frame 111.

The latch 100 is such that, when the seat back S2 is in the raised position, the hook 120 is located in the first position (the position in FIG. 2) and the striker ST is located in the first groove part 122A. The latch 100 is such that, when the seat back S2 is in the reclining position, the hook 120 is located in a second position (the position in FIG. 11) that is a position the hook 200 assumes when it is rotated in the first direction from the first position and the striker ST is located in the second groove part 122B.

The lock member (the first lock cam 140 and the second lock cam 150) prevents the rotation of the hook 120 located in the first position.

The first lock cam 140 includes a main cam 140A and a block out cam 140B. The first lock cam 140 is biased in the first direction by a torsion spring 148. One arm of the torsion spring 148 is engaged with the main cam 140A and the other arm is engaged with the main frame 111.

The main cam 140A is made of a metal plate by press forming. The main cam 140A includes a bearing hole 141, a first arm 142, and a second arm 143. The shaft 149 is inserted in the bearing hole 141. The shaft 149 is fixed to the main frame 111. The main cam 140A is supported by the main frame 111, rotatably about an axis X2, via the shaft 149.

A pin 142A protruding in the axial direction is fixed to the first arm 142.

A pin 143A protruding in the axial direction is fixed to the second arm 143A. The second arm 143 has at its end a first rotation prevention surface 143B forming a nearly flat convex surface. The first rotation prevention surface 143B contacts the first lock surface 125B of the hook 120 from rotating in the second direction, thereby preventing the hook 120 from rotating in the second direction. The second arm 143 includes, at its lower side in FIG. 3, a recess 143C that is engageable with the end portion 124B of the hook 120. When the hook 120 is in the first position, the recess 143C can engage with the end portion 124B of the hook 120.

The block out cam 140B includes a bearing hole 146A, a first arm 146B, and a second arm 146C. The shaft 149 is inserted in the bearing hole 146A. The block out cam 140B is supported by the main frame 111, rotatably about the axis X2, via the shaft 149. A fitting hole 146H is formed in the first arm 146B. The pin 143A is fitted in the fitting hole 146H. This enables the main cam 140A and the block out cam 140B to rotate about the axis X2 together. The second arm 146C extends downwards. The second arm 146C includes a contact part 146L at its end. The contact part 146L contacts the protrusion 125D of the hook 120 in the open position and prevents the rotation of the hook 120 in the first direction.

The second lock cam 150 is made of a metal plate by press forming. The second lock cam 150 includes a bearing hole 151, a pin 152, a guide protrusion 153, and a second rotation prevention surface 154. The second rotation prevention surface 154 contacts the second lock surface 125C of the hook 120 in the first position, thereby preventing the hook 120 from rotating in the first direction. A shaft 159 is inserted in the bearing hole 151. The shaft 159 is fixed to the main frame 111. The second lock cam 150 is thus supported by the main frame 111, rotatably about an axis X3, via the shaft 159.

The pin 152 protrudes in one direction parallel to the axial direction.

The guide protrusion 153 protrudes in the other direction parallel to the axial direction. Here, the main frame 111 includes a guide hole 111B extending along a segment of a circle the center of which coincides with the axis X3. The guide protrusion 153 is inserted in the guide hole 111B. This enables the second lock cam 150 to rotate in the range that the lock guide protrusion 153 to move from one end of the guide hole 111B to the other end of the guide hole 111B.

The second rotation prevention surface 154 is located at the end of the second lock cam 150. The second rotation prevention surface 154 is a nearly flat convex surface.

The shaft 159 has an engaging groove 159A at one end thereof. A center-side end of a spiral spring 158 is engaged in the engaging groove 159A. The other end of the spiral spring 158 is engaged with a side surface of the second lock cam 150. The second lock cam 150 is biased in the second direction by the spiral spring 158.

The interlocking link 160 is a member that interlocks the rotational motion of the first lock cam 140 with the rotational motion of the second lock cam 150. The interlocking link 160 extends in the left-right direction of FIG. 2, and includes a bearing hole 161, an elongated hole 162, and a notch 163. The shaft 149 is inserted in the bearing hole 161. This enables the interlocking link 160 to rotate about the same axis as an axis of rotation of the first lock cam 140. The interlocking link 160 is connected to the second lock cam 150 by the pin 152 of the second lock cam 150 engaging with the elongated hole 162. The notch 163 can be engaged with the pin 143A when the interlocking link 160 rotates in the first direction relative to the first lock cam 140. The first lock cam 140 and the interlocking link 160 rotate together coaxially about the axis X2 when the notch 163 and the pin 143A are engaged.

The release lever 130 includes a shaft 131, a holding part 132, a connecting arm 133, and a flag operating part 134.

The shaft 131 extends in the axial direction. The lever frame 115 supports the shaft 131 in a manner that permits the shaft 131 to rotate. The release lever 130 is thus rotatably supported by the lever frame 115. The position of the release lever 130 in FIG. 2 is a position in a state that the latch 100 is in a lock state and is not operated, and the position in this state will be referred to as "initial position."

The holding part 132 extends upward from the shaft 131. The holding part 132 is exposed at the upper part of the seat back S2. The connecting arm 133 extends downward from the holding part 132.

The connecting arm 133 has an engaging groove 133A at its end. The engaging groove 133A engages with the pin 142A of the first lock cam 140. Therefore, the rotational motion of the lever 130 is transmitted to the lock cam 141, and moment of the lock cam 140 is transmitted to the release lever 130. A lower end portion of the connecting arm 133 is pulled frontward by a spring 138. The release lever 130 is thus biased in the second direction by the spring 138.

The flag operating part 134 extends from the shaft 131 in a direction different from a direction in which the holding part 132 extends. In the present embodiment, the flag operating part 134 protrudes rearward from the shaft 131.

The flag 170 is a member that shows to the outside that the latch 100 is in the unlocked state. In the present embodiment, the lock state refers to a state that the striker ST is engaged with the hook 120 and the hook 120 cannot move, and the unlocked state refers to a state other than the lock state (including a state in which the latch is in a release position as described below). The flag 170 does not protrude from the top surface of the lever frame 115 as shown in FIG. 2, when the hook 120 engages with the striker ST and is in the lock state. The flag 170 may slightly protrude from the top surface of the lever frame 115 when the latch 100 is in the lock state. The flag 170 has an engaging hole 171. The flag operating part 134 of the release lever 130 is inserted in the engaging hole 171. When the release lever 130 rotates from the initial position in FIG. 2 to the front of the seat S, the flag operating part 134 pushes the flag 170 upward, and thus the flag 170 protrudes from the upper surface of the lever frame 115 (refer to FIG. 4 and other drawing figures).

Operation of the latch 100 configured as described above will be described.

Figure 4:
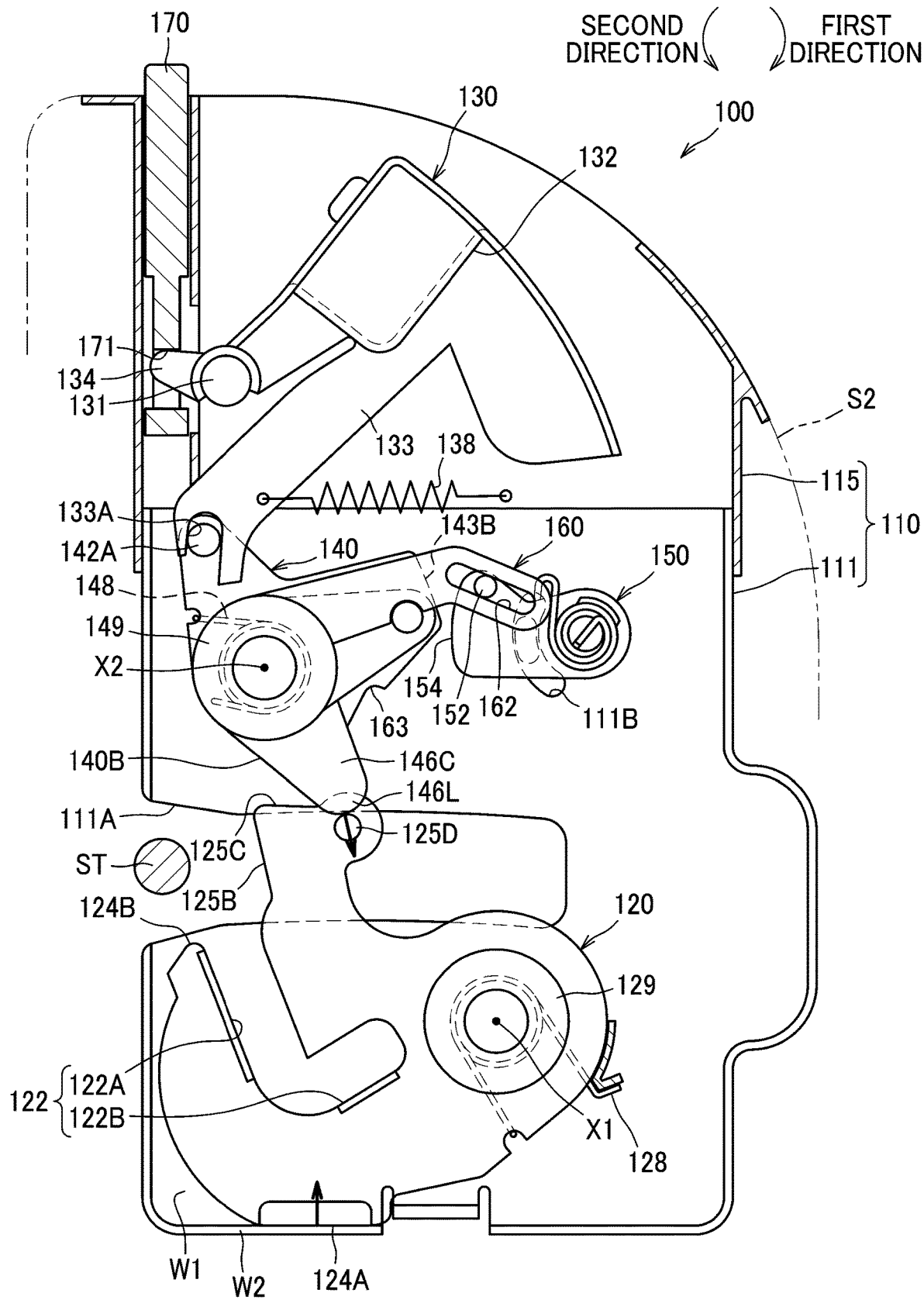
FIG. 4 is a diagram of the hook in an open position according to the first embodiment.

As shown in FIG. 4, when the release lever 130 is operated by being pulled toward the front and the striker ST is disengaged from the hook 120, putting the hook 120 in the open position, the contact part 146L at the end of the block out cam 140B contacts the lock protrusion 125D of the hook 120. The block out cam 140B is biased in the first direction by the spring 138 and the torsion spring 148, and therefore, even if the hook 120 is induced to rotate in the first direction to close, the block out cam 140B prevents the rotation of the hook 120 in the first direction. Rather, the block out cam 140B biases the hook 120 to cause it to rotate in the second direction, and the contact surface 124A of the hook 120 contacts the side wall W2 of the main frame 111 to thereby determine the position of the hook 120. When the hook 120 is in the open position, the release lever 130 is pulled toward the front, whereby the flag operating part 134 pushes the flag 170 upward. This makes it known to the user that the lock is released.

Figure 5:
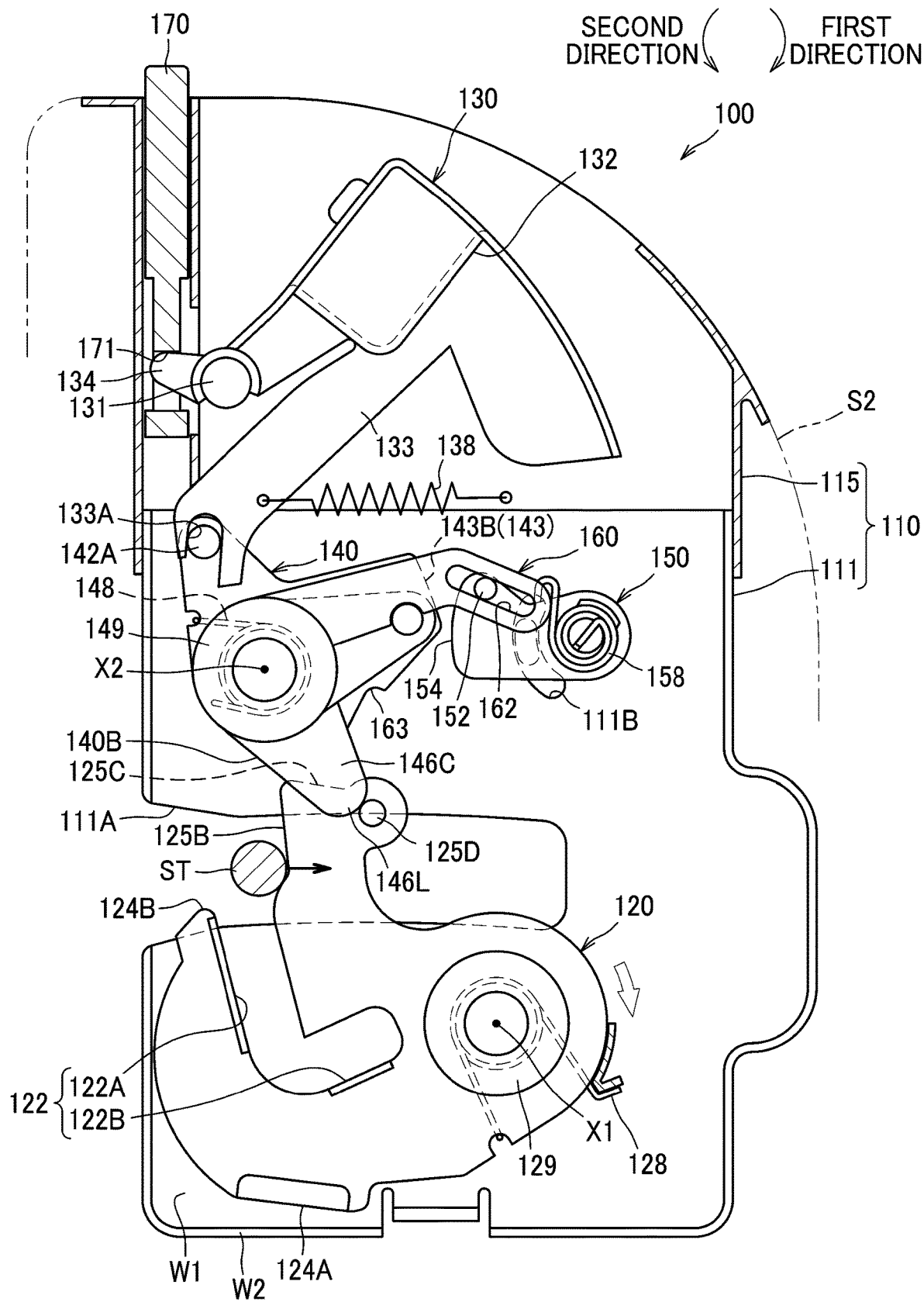
FIG. 5 is a diagram showing a state in which the hook has been pushed and moved from the open position by a striker according to the first embodiment.

When the seat back S2 is inclined from the open position rearward and the striker ST contacts the hook 120, the striker ST pushes and rotates the hook 120 in the first direction. Then, as shown in FIG. 5, the lock protrusion 125D pushes aside the block out cam 140B and crosses over the end of the contact part 146L. Thus, restraint laid on the hook 120 in rotating in the first direction by the block out cam 140B is lifted.

Figure 6:
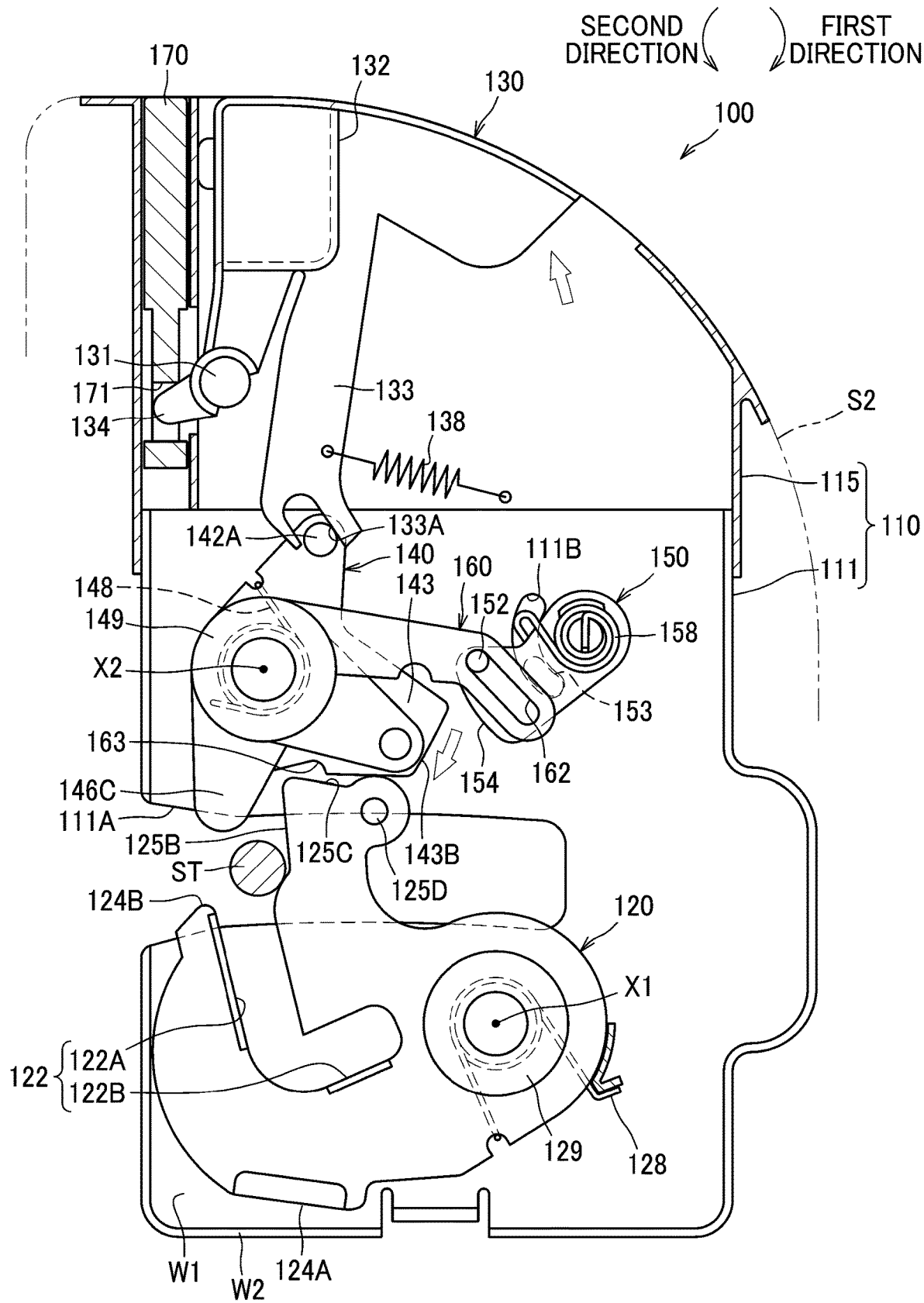
FIG. 6 is a diagram showing a state in which the release lever has been returned from the state in FIG. 5.

If the release lever 130 is not operated in the state of FIG. 5, the release lever 130 is returned to the initial position by the spring 138, as shown in FIG. 6.

The first lock cam 140 is rotated in the first direction from the state in FIG. 5 by the biasing force of the torsion spring 148. The rotation of the first lock cam 140 in the first direction is stopped by the second arm 143 of the main cam 140A contacting the hook 120, and the position of the first lock cam 140 is determined.

The second lock cam 150 is rotated in the second direction by the biasing force of the spiral spring 158. At this time, the second lock cam is stopped from further rotating in the second direction by the guide protrusion 153 contacting the lower end of the guide hole 111B, so that the position of the second lock cam 150 is determined. The position of the interlocking link 160 is determined following the motion of the second lock cam 150.

Figure 7:
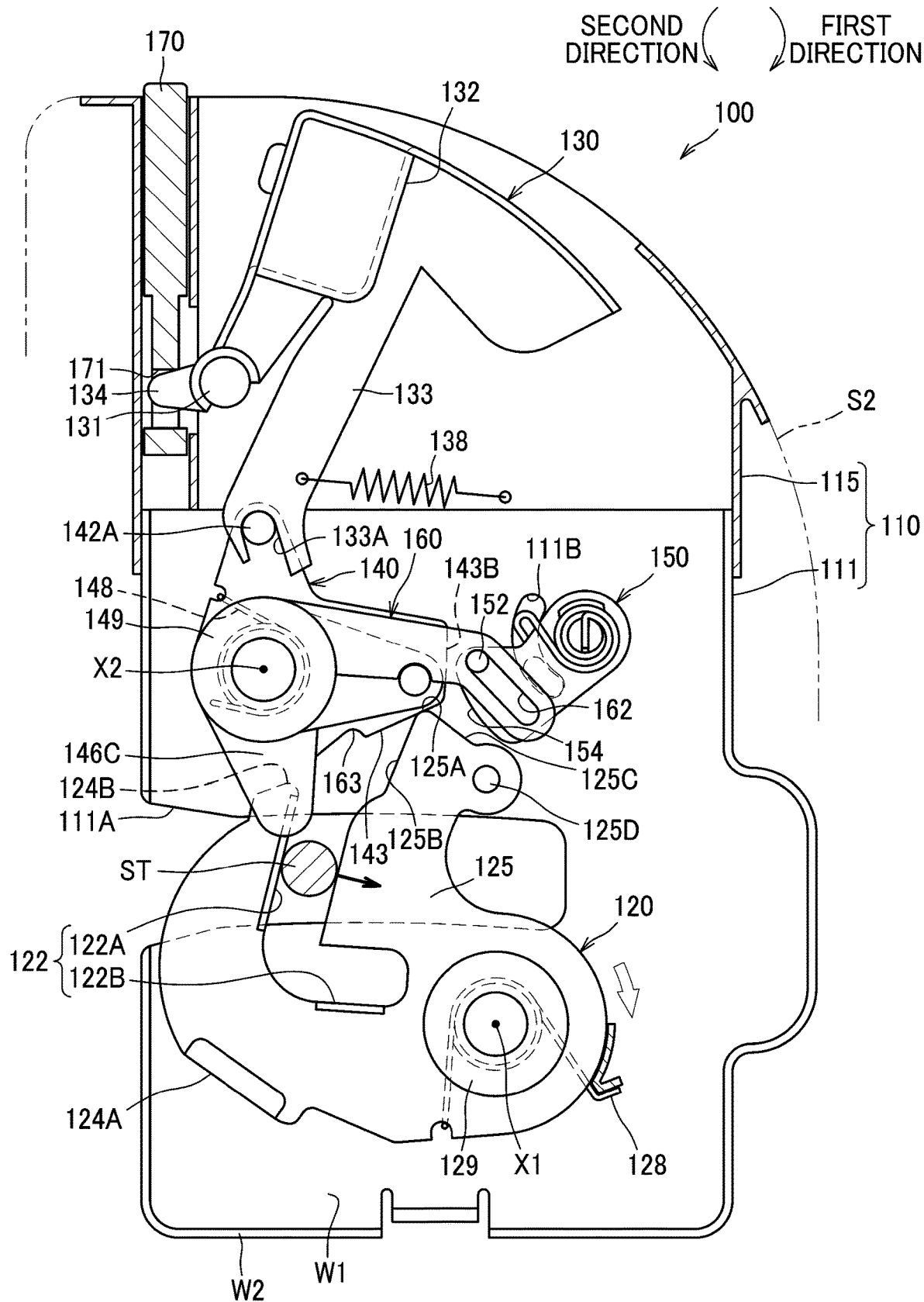
FIG. 7 is a diagram showing a state in which the hook has been further pushed and moved by the striker from the state in FIG. 6.

When the seat back S2 is inclined further rearward from the state in FIG. 6, the hook 120 is pushed in the first direction by the striker ST, and, as shown in FIG. 7, the striker ST enters the first groove part 122A of the engaging groove 122. At this time, the opposed part 125 and its end portion 125A of the hook 120 pushes the first lock cam 140 upward, and rotates the first lock cam 140 in the second direction. Thus, the release lever 130 is caused to rotate in the first direction by the first lock cam 140.

Figure 8:
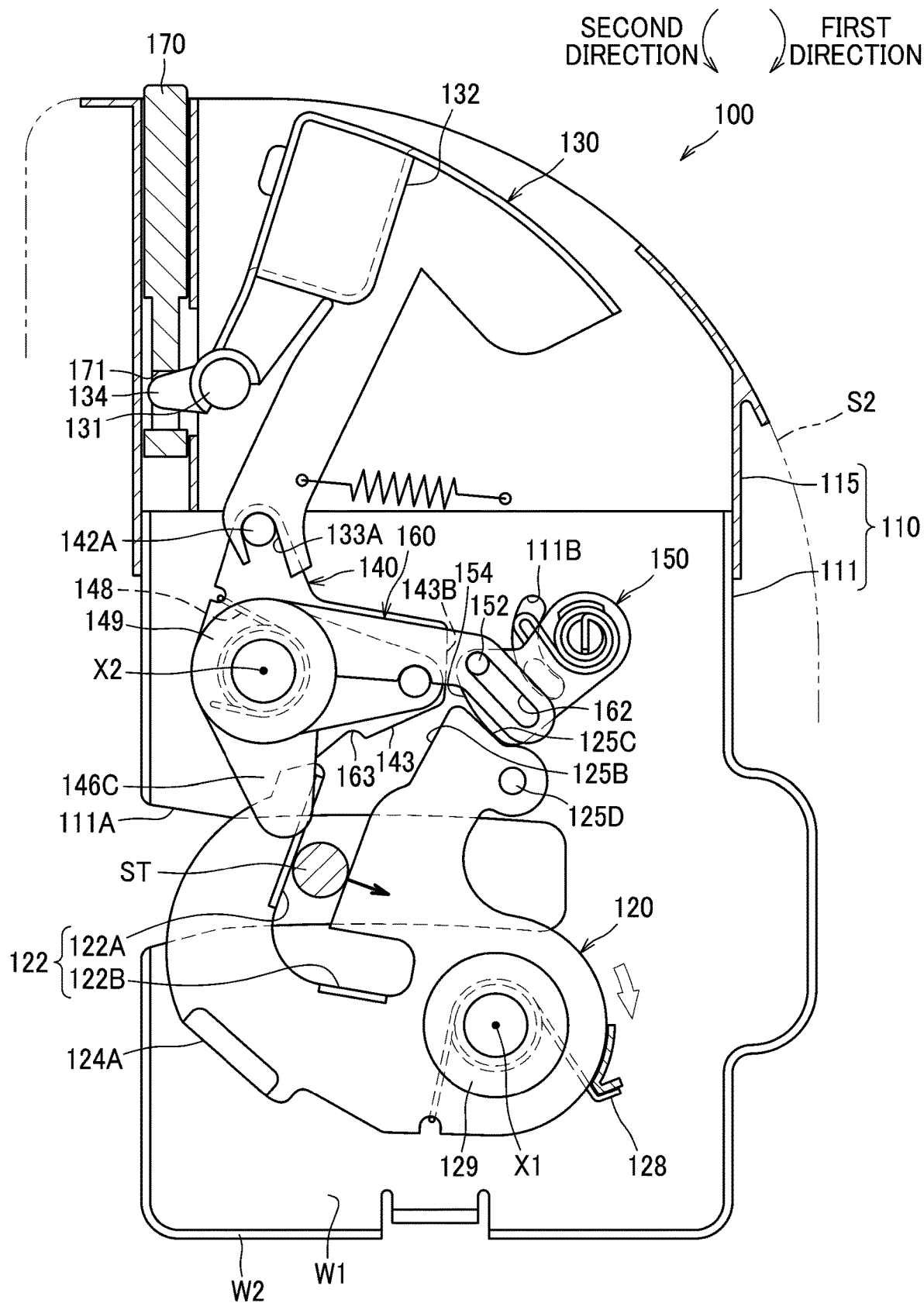
FIG. 8 is a diagram showing a state in which the hook has been further pushed and moved by the striker from the state in FIG. 7 to a position just before the first lock position.

When the seat back S2 is inclined further rearward from the state in FIG. 7, the hook 120 is pushed in the first direction by the striker ST in the first groove part 122A, and, as shown in FIG. 8, the first lock surface 125B of the hook 120 is located outside of the rotatable region of the second arm 143 of the first lock cam 140. In other words, in FIG. 8, the first lock surface 125B is located to the right of the first rotation prevention surface 143B of the second arm 143. The hook 120 is restrained from rotating further in the first direction by the second lock surface 125C contacting the second rotation prevention surface 154 of the second lock cam 150.

When the hook 120 no longer restrains the first lock cam 140 from rotating in the first direction, as in FIG. 8, the first lock cam 140 is caused to rotate in the first direction by the biasing force of the torsion spring 148, as shown in FIG. 2. The first rotation prevention surface 143B contacts the first lock surface 125B of the hook 120 and prevents the hook 120 from rotating in the second direction. In other words, the hook 120 prevented from rotating in the first direction by the second lock cam 150, and prevented from rotating in the second direction by the first lock cam 140 to thereby lock in the first position. The position of the latch 100 in this state will be referred to as the "first lock position."

Figure 9:
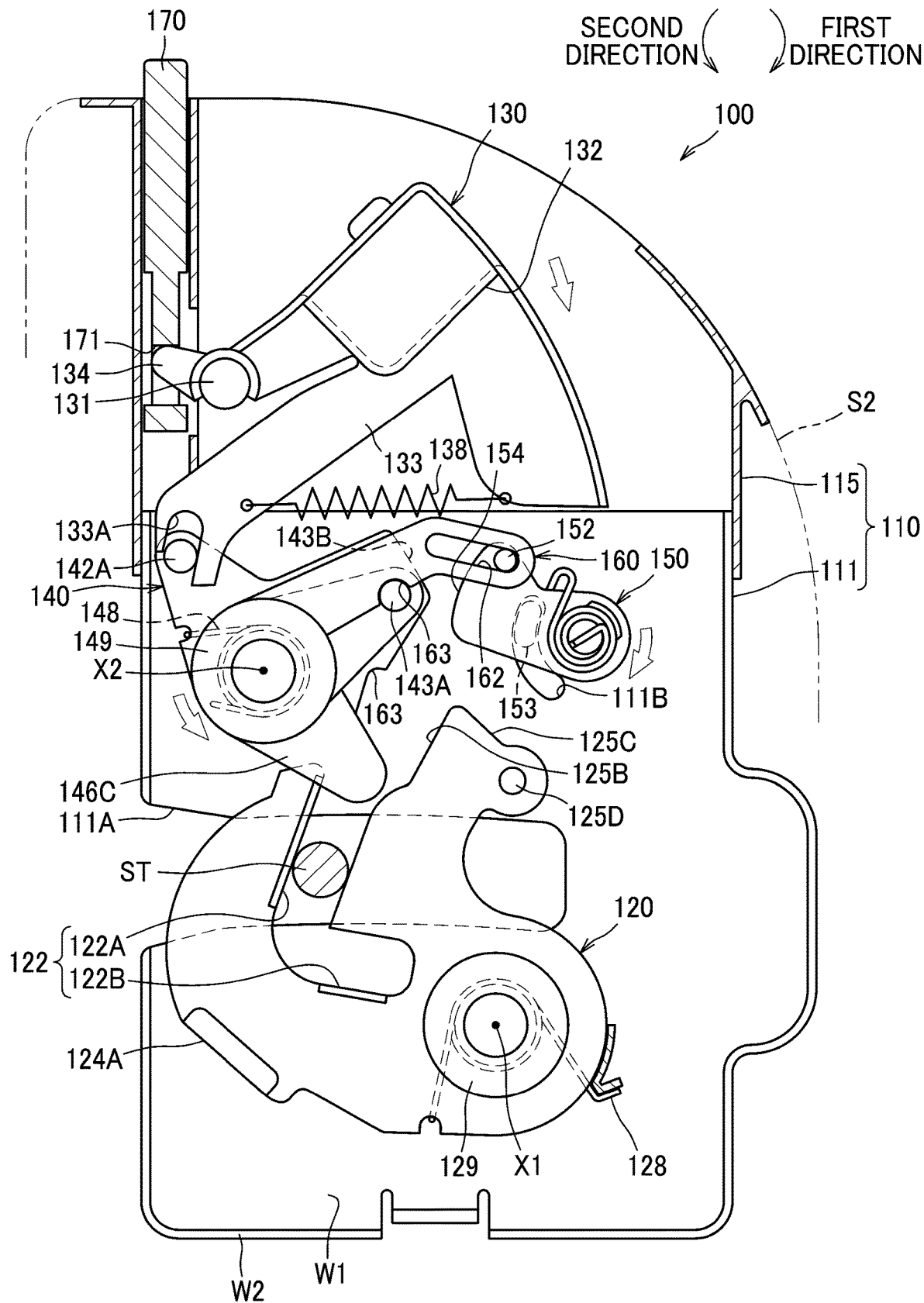
FIG. 9 is a diagram showing a state in which the release lever has been pushed down from the first lock position until the lock is released according to the first embodiment.

When the latch 100 is in the first lock position as shown in FIG. 2 the seat back S2 is locked in the raised position. When the latch 100 is in the first lock position, the striker ST is fixed in a first fixed position relative to the latch 100. To incline the seat back S2 frontward from the raised position in FIG. 2, or to incline the seat back S2 rearward to the reclining position, the release lever 130 is pulled frontward to release the lock, as shown in FIG. 9. When the release lever 130 is pulled frontward, the connecting arm 133 pushes the pin 142A of the first lock cam 140, and the first lock cam 140 is caused to rotate in the second direction. When the first lock cam 140 rotates in the second direction, the pin 143A engages with the notch 163 of the interlocking link 160 and pushes the interlocking link 160 upward. And then, the interlocking link 160 pulling up the pin 152 of the second lock cam 150 rotates the second lock cam 150 in the first direction. The position of the second lock cam 150 is determined by the guide protrusion 153 contacting the upper end of the guide hole 111B. As shown in FIG. 9, when the first lock cam 140 and the second lock cam 150 are located outside of the range of rotation of the hook 120 by the operation of the release lever 130, the hook 120 is made rotatable in the first direction and in the second direction. In other words, the seat back S2 is rendered capable of being freely inclined frontward or rearward. A state of the latch 100 in which the release lever 130 is firmly pulled frontward and the hook 120 is rotatable without interfering with the first lock cam 140 and the second lock cam 150 will be referred to as "release position."

Figure 10:
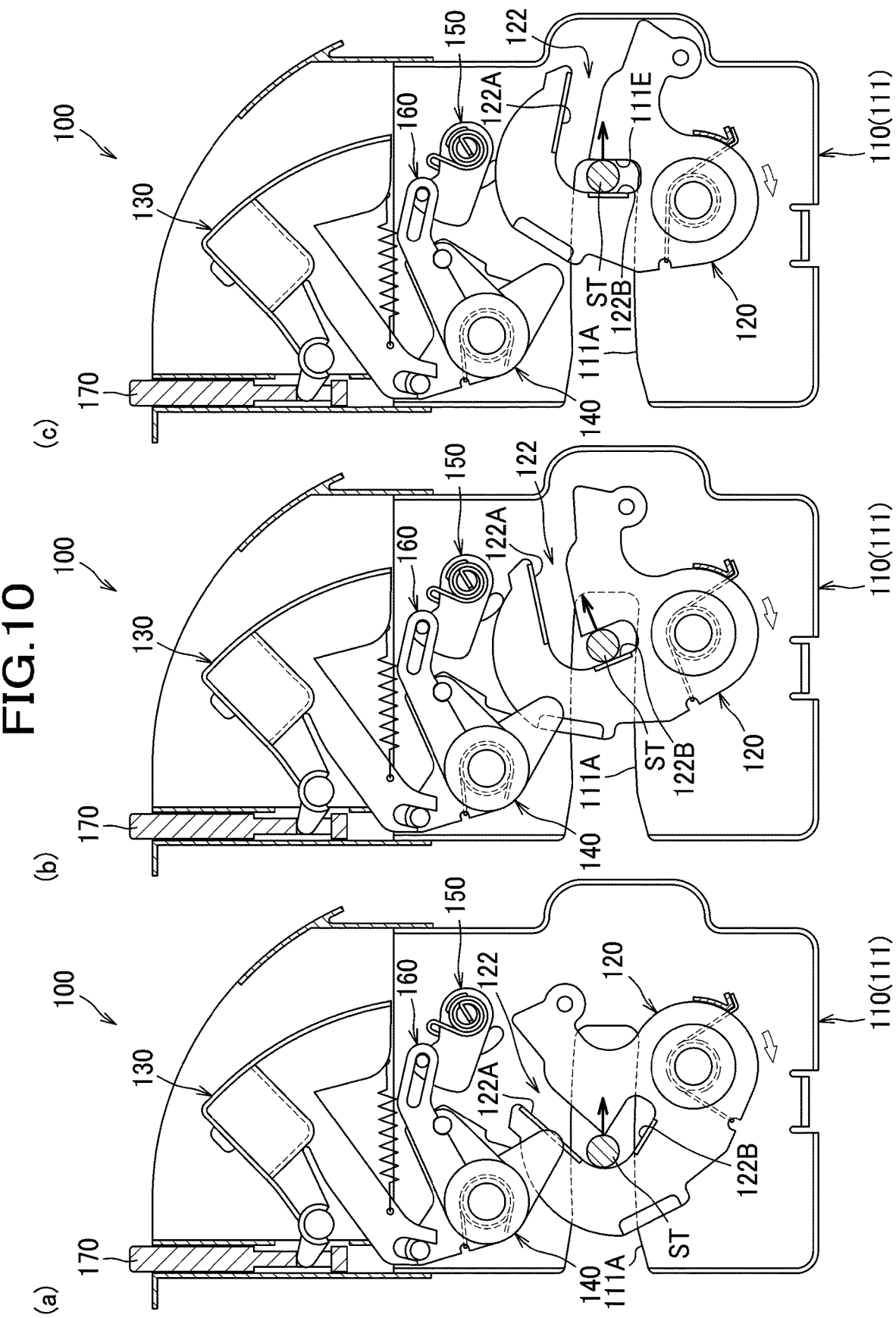
FIG. 10 includes diagrams (a) to (c) showing a process in which the hook is pushed by the striker located in a first groove part, and the striker moves to a second groove part.

When the seat back S2 with the latch 100 located in the release position is inclined to the rear, the striker ST pushes and causes the hook 120 to rotate in the first direction. Then, the striker ST moves inside the first groove part 122A of the engaging groove 122 toward the second groove part 122B and arrive at a position between the first groove part 122A and the second groove part 122B, as shown in FIG. 10(a). Afterwards, when the seat back S2 is inclined further rearward, the striker ST enters the second groove part 122B as shown in FIG. 10(b), and when the striker ST contacts an innermost end surface 111E of the receiving groove 111A, as shown in FIG. 10(c), the hook 120 is made unable to rotate further in the first direction.

Figure 11:
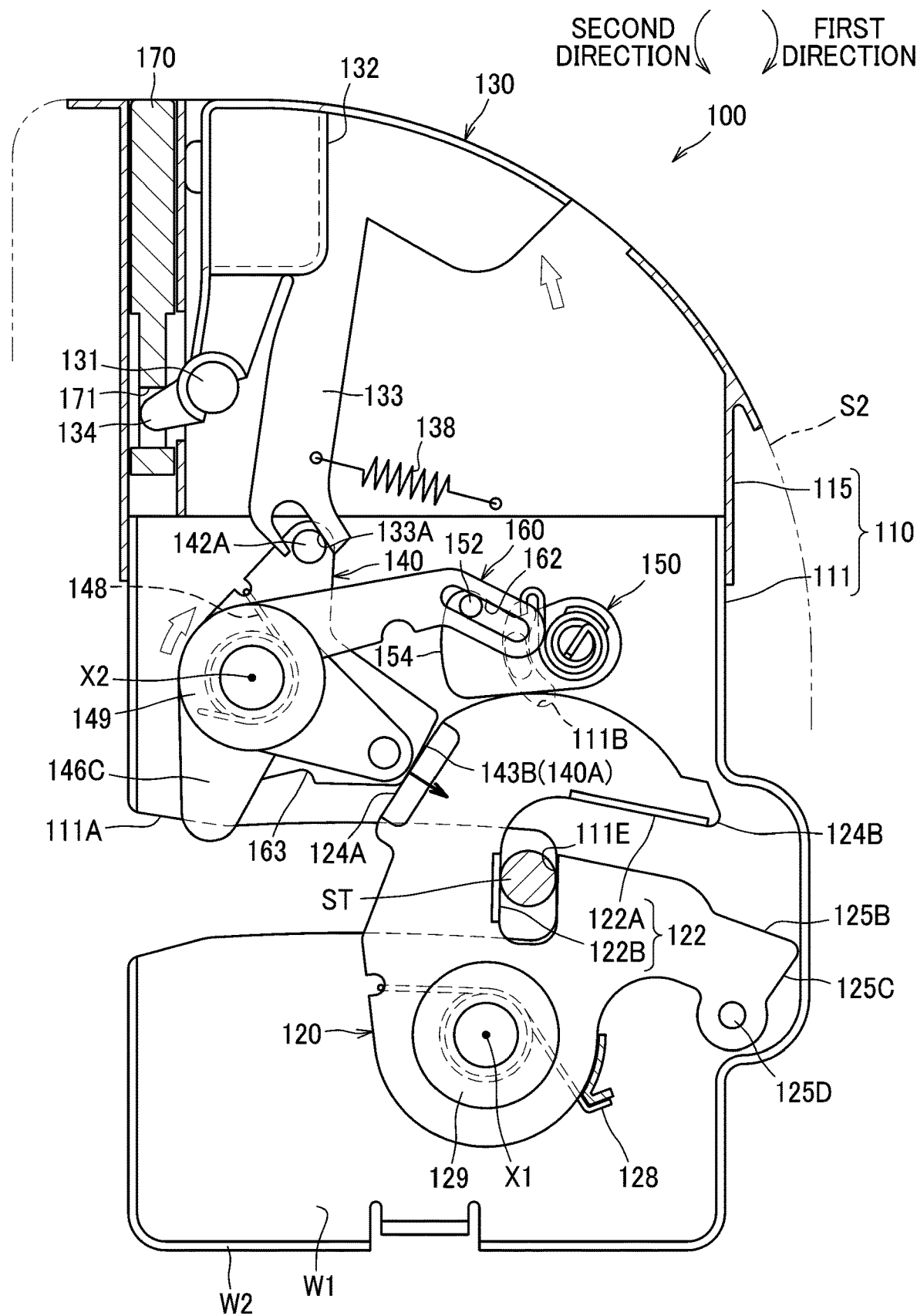
FIG. 11 is a diagram showing a state in which the latch is in the second lock position.

In this state, when the operation of the release lever 130 is ceased and the release lever 130 is set free, the release lever 130 is returned to the initial position by the biasing force of the spring 138 and the first lock cam 140 rotates in the first direction by the biasing force of the torsion spring 148, as shown in FIG. 11. Accordingly, the first rotation prevention surface 143B of the main cam 140A contacts the contact surface 124A of the hook 120. Thereby, the first rotation prevention surface 143B prevents the hook 120 from rotating in the second direction. The hook 120 is prevented from rotating in the first direction by the striker ST held between the hook 120 and the end surface 111E of the main frame 111, and prevented from rotating in the second direction by the first lock cam 140. Thus, the seat back S2 is locked in the reclining position. The position of the latch 100 in this state will be referred to as "second lock position." When the latch 100 is in the second lock position, the striker ST is fixed in a second fixed position relative to the latch 100. The second fixed position is a position deeper toward the bottom of the receiving groove 111A than to the first fixed position.

To move the seat back S2 from the state in which the latch 100 is in the second lock position and the seat back S2 is in the reclining position, the release lever 130 is operated to place the latch 100 in the release position in FIG. 10(c), and the seatback S2 is moved frontward. To lock the seat back S2 in the raised position the release lever 130 is returned when the seat back S2 is in the raised position. To fold the seat back S2 on top of the seat cushion S1, the release lever 130 is pulled until the striker ST is disengaged from the hook 120, and the release lever 130 is returned after the striker ST is disengaged from the hook 120.

According to the above, the following advantageous effects can be achieved in the first embodiment. The striker ST is located in the first groove part 122A when the hook 120 is in the first position, and the striker ST is located in the second groove part 122B when the hook 120 is in the second position. The first groove part 122A and the second groove part 122B are connected and forms a single engaging groove 122, and thus while the seat back S2 is moved from the raised position to the reclining position, the striker ST remains engaged in the engaging groove 122. Therefore, the striker ST can be smoothly locked in the two positions.

Since the second groove part 122B extends in a direction different from a direction in which the first groove part 122A extends, the engaging groove 122 can be easily positioned to cross the direction in which the receiving groove 111A extends in both of the situations: when the hook 120 is in the first position and when the hook 120 is in the second position.

Since the second groove part 122B is closer, than the first groove part 122A, to the rotation axis X1 of the hook 120, the striker ST when moving from the first groove part 122A to the second groove part 122B gradually comes closer to the rotation axis X1. Therefore, the striker ST can be caused to move smoothly, between a state in which it is engaged with the second groove 122B and a state in which it is engaged with the first groove 122A, relative to the hook 120.

Since the shaft 129 supporting the hook 120 is shifted relative to the receiving groove 111A in a direction perpendicular to the direction in which the receiving groove 111A extends, the hook 120 can be rotated by pressing the striker ST against the hook 120.

When the latch 100 is in the first lock position, the second lock cam 150 prevents the rotation of the hook 120 in the first direction and the first lock cam 140 prevents the rotation of the hook 120 in the second direction; therefore the seat back S2 can be firmly locked.

Since the interlocking link 160 connects the first lock cam 140 and the second lock cam 150, the second lock cam 150 can be moved synchronously with the first lock cam 140.

The latch 100 in the first embodiment can be applied even to a particular configuration in which the striker ST have only one bar-shaped part that engages with the hook 120.

Second Embodiment

Next, a second embodiment of a latch will be described with reference to FIG. 12 to FIG. 20. Descriptions of configurations substantially the same as those of the first embodiment will be omitted as appropriate.

A latch 200 according to the second embodiment can also be used to lock the seat back S2 in the raised position and the reclining position, as in the latch 100 described in the first embodiment. Though not shown in the figures, the latch 200 is, for example, fixed to and used for the seat back S2 as shown in FIG. 1. The latch 200, similar to the latch 100, can take the first lock position for locking the seat back S2 in the raised position (refer to FIG. 15), and the second lock position for locking the seat back S2 in the reclining position (refer to FIG. 20). It is understood that the first lock position and the second lock position are different only in the position of the striker ST relative to the latch 200, and the state of the latch 200 itself remains unchanged. When the latch 200 is in the first lock position, the striker ST is fixed to a first fixing position as a position relative to the latch 200. When the latch 200 is in the second lock position, the striker ST is fixed to a second fixed position as another position relative to the latch 200. The second fixed position is a position deeper toward the bottom of a receiving groove 211A further inward than.

Figure 12:
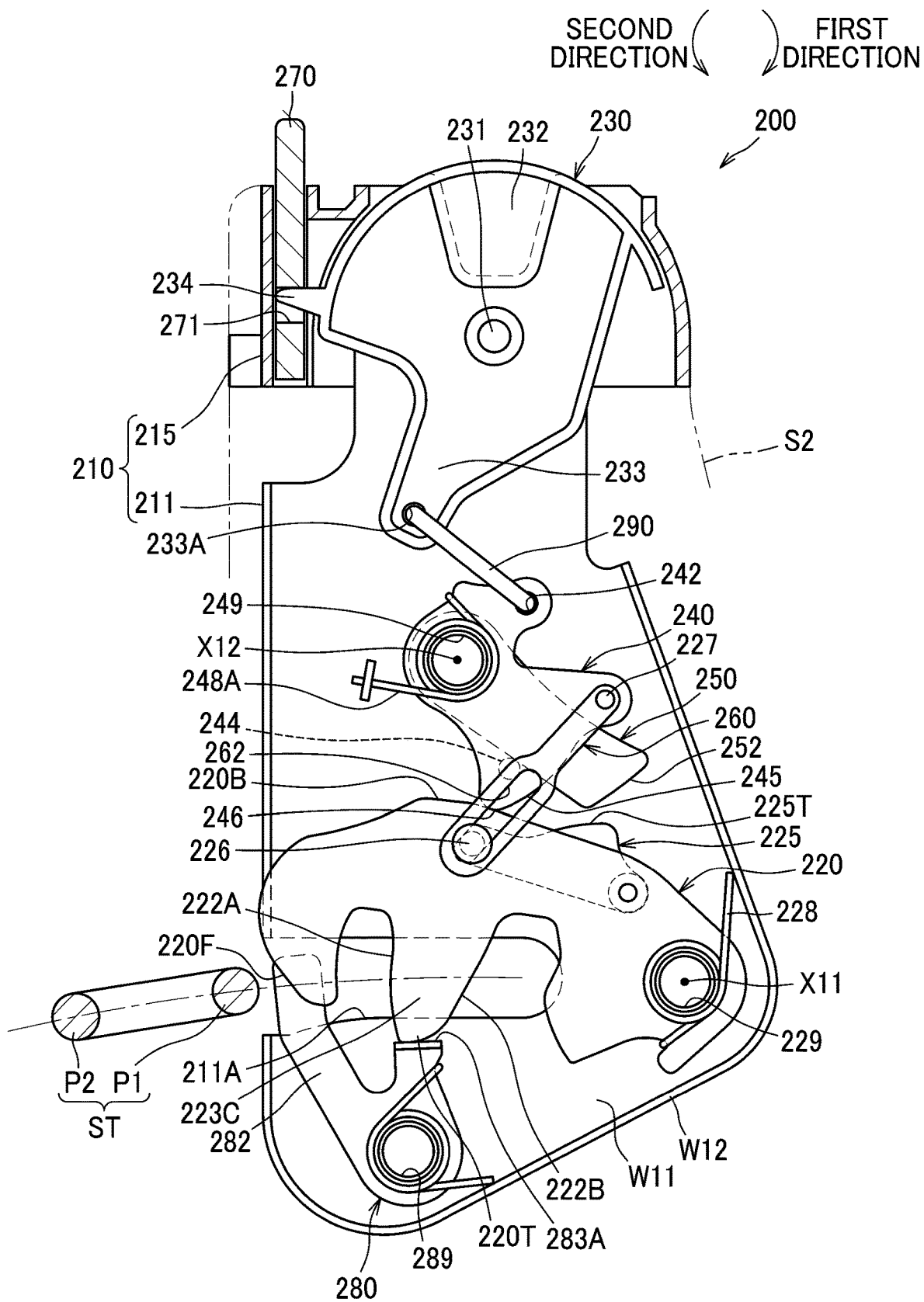
FIG. 12 is a diagram showing a latch of a second embodiment in a disengaged position in which the striker is not engaged to a hook.
Figure 13:
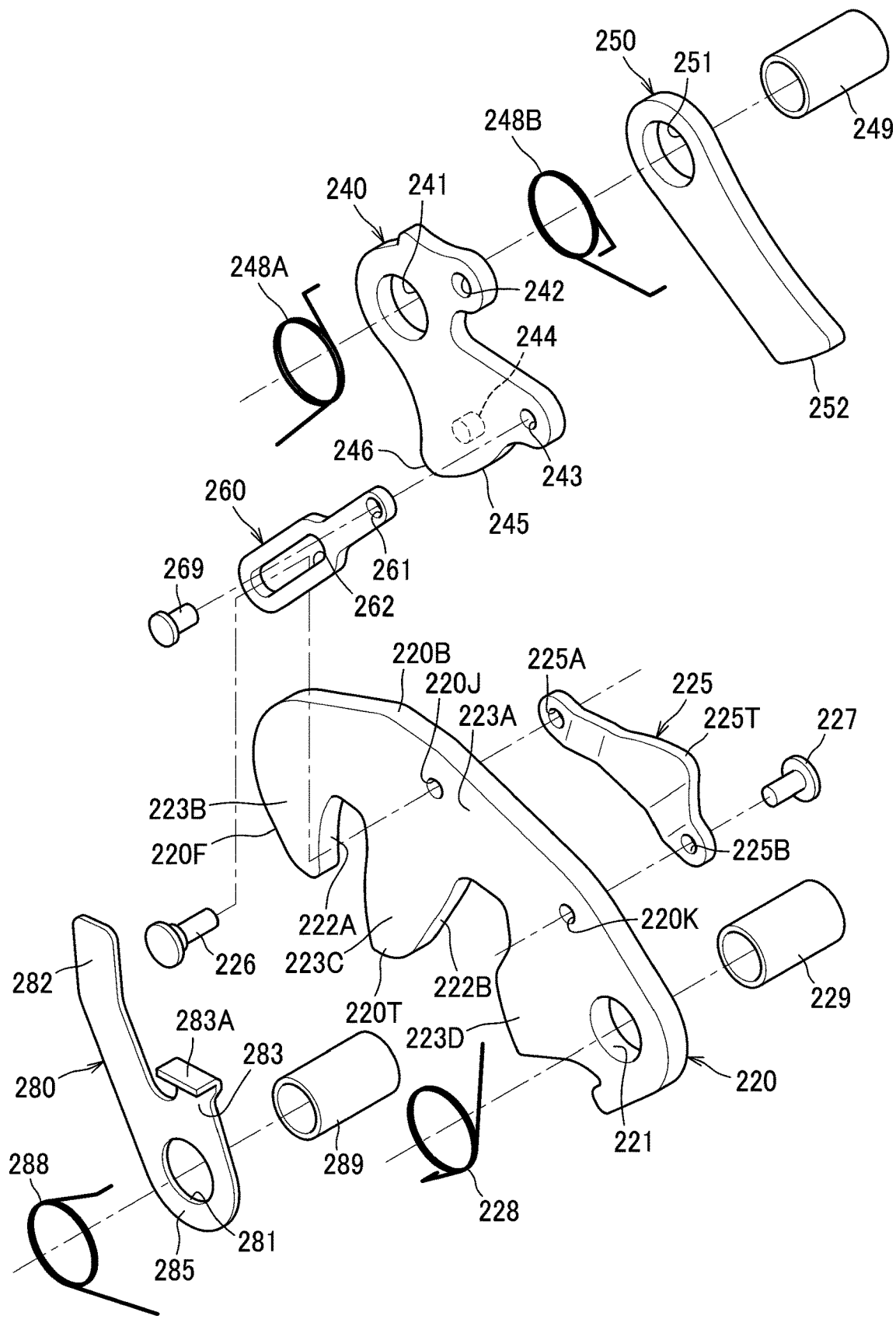
FIG. 13 is an exploded perspective view of the latch of the second embodiment.

As shown in FIG. 12 and FIG. 13, the latch 200 integrated with the lever mainly comprises a frame 210, a hook 220, a release lever 230, a lock cam 240, a pressing arm 250, an interlocking link 260, a flag 270, a finger member 280 (prop finger), and a link 290. The striker ST includes a U-shaped bar having a first pin P1 and a second pin P2 disposed to the rear of the first pin P1. In the present embodiment, the front/rear (frontward/rearward) and up/down (upward/downward; upper/lower) are represented with reference to the seat S in FIG. 1, as in the first embodiment.

The frame 210 comprises a main frame 211 supporting the hook 220, the lock cam 240, the pressing arm 250 and the finger member 280, and a lever frame 215 supporting the release lever 230 and the flag 270. The lever frame 215 is fixed to the top of the main frame 211. Though omitted in the figures, the frame 210 is configured to include a cover not shown in the figures and forms a housing comprised of the main frame 211 and the lever frame 215 shown in the figures, and the cover, for stowing each component.

The main frame 211 has a receiving groove 211A capable of receiving a striker ST. The receiving groove 211A extends in an approximately straight line. Specifically, the receiving groove 211A extends in a gentle curve along a segment of a circle the center of which coincides with the rotation axis of the seat back S2. The main frame 211 includes a support wall W11 that supports the hook 220 and other components, and a side wall W12 extending along the outer edge of the support wall W12 in a direction perpendicular to the support wall W12 such that the components are surrounded by the side wall W12. The side wall W12 may be integrally formed with the support wall W11, or may be a member formed of a member other than the support wall W11. For example, the side wall W12 may be formed as a part of the cover to be placed over the support wall W11 to house the components in combination with the support wall W11.

The hook 220 is formed of a thick metal plate. The hook 220 may be covered partially or entirely with plastic, rubber or the like. The hook 220 is rotatably supported by the main frame 211. The hook 220 is rotatable about an axis X11 in a first direction, that is, a clockwise direction in FIG. 12, and a second direction opposite to the first direction.

The hook 220 comprises a first engaging groove 222A in which the striker ST is engageable, and a second engaging groove 222B which is located at a position different from the first engaging groove 222A and in which the striker ST is engageable. The second engaging groove 222B is closer, than the first engaging groove 222A, to the rotation axis X11, i.e. the center of rotation, of the hook 220. The first engaging groove 222A and the second engaging groove 222B extend in directions non-parallel to a direction away from the axis X11 as viewed with a line of sight aligned with the axis X11 (for convenience, with reference to a direction of a radius of a circle the center of which coincides with the axis X11, this direction will be referred to as "radial direction" in the present embodiment). The distance between the first engaging groove 222A and the second engaging groove 222B are similar to the distance between the first pin P1 and the second pin P1 of the striker ST. The hook 220 is rotatable between an engaging position in which the first engaging groove 222A and the second engaging groove 222B cross the receiving groove 211A and the striker ST is engageable with at least one of the first engaging grove 222A and the second engaging groove 222B (refer to FIG. 15 and FIG.

Figure 19:
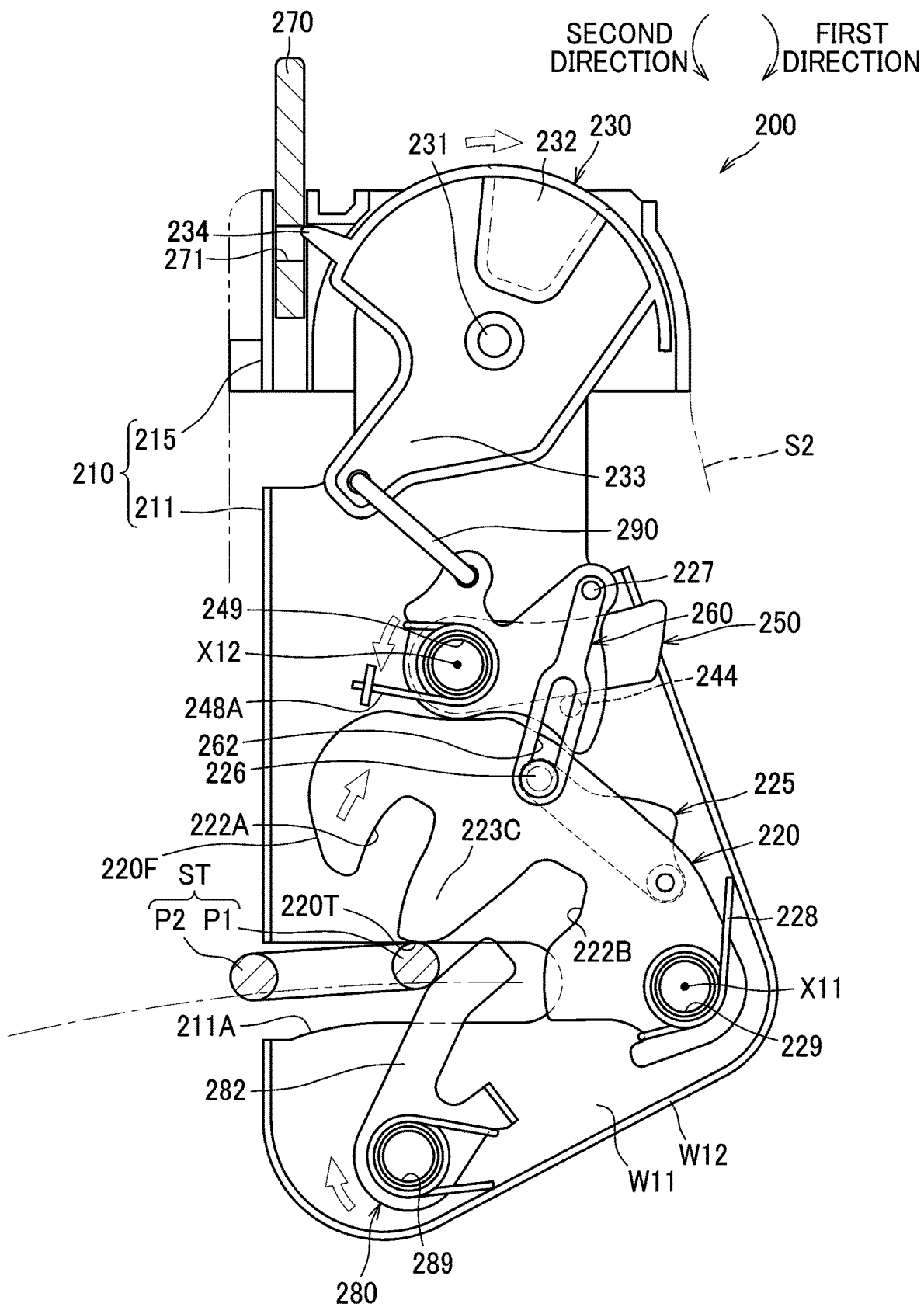
FIG. 19 is a diagram showing the latch located in the release position by the operation of the release lever according to the second embodiment.

20), and a non-engaging position in which the first engaging groove 222A and the second engaging groove 222B are retreated from the receiving groove 211A such that the striker ST is movable inside of the receiving groove 211A (refer to FIG. 19). The state in FIG. 12 is a state in which the release lever 230 is not operated and the striker ST is not engaged with the hook 220, and the position of the latch 200 in this state will be referred to as "disengaged position."

The hook 220 comprises a body part 223A, a first protrusion 223B, a second protrusion 223C, and a third protrusion 223D. The body part 223A is a part elongated in the front-rear direction and has a bearing hole 221 in one end portion thereof. The body part 223A also has a hole 220J and a hole 220K in an upper part thereof. A hollow cylindrical shaft 229 is inserted in the bearing hole 221. The shaft 229 inserted in the bearing hole 221 is fixed to the main frame 211. The shaft 229 thus connects the hook 220 to the main frame 211 in a manner that permits the hook 220 to rotate. The shaft 229 is located on the extension line of the receiving groove 211A.

The first protrusion 223B extends from an end portion of the body part 223A opposite to the end portion in which the bearing hole 221 is provided, in a direction non-parallel to the radial direction. The second protrusion 223C is provided between the bearing hole 221 and the first protrusion 223B, and extends in a direction non-parallel to the radial direction. The third protrusion 223D is provided between the bearing hole 221 and the second protrusion 223C, and extends in a direction non-parallel to the radial direction. An opening provided between the first protrusion 223B and the second protrusion 223C forms the first engaging groove 222A. An opening between the second protrusion 223C and the third protrusion 223D forms the second engaging groove 222B. The second protrusion 223C has an end portion 220T that protrudes farther than that of the first protrusion 223B. The first protrusion 223B has an inclined surface 220F inclined relative to the radial direction at a side thereof farther away from the axis X11. The inclined surface 220F is inclined upward with distance, relative to the radial direction, from the axis X11.

The body part 223A has a back surface 220B at a side facing away from the first protrusion 223B, the second protrusion 223C, and the third protrusion 223D. The back surface 220B is a surface that contacts the lock cam 240 when the rotation of the hook 220 in the first direction is prevented by the lock cam 240.

The hook 220 includes a sub-plate 225. The sub-plate 225 is located at one side, of the body part 223A (behind the body part 223A in FIG. 13), facing in a direction parallel to the axis X11 (hereafter, referred to as "axial direction" in the present embodiment). In other words, the sub-plate 225 is located at a position shifted from a position of the hook 220 in the axial direction. The sub-plate 225 has a hole 225A and a hole 225B. The sub-plate 225 is fixed to the body part 223A by a pin 226 inserted into the hole 220J and the hole 225A and a pin 227 inserted in the hole 225B and the hole 220K.

The sub-plate 225 has a to-be-pressed surface 225T provided at an upper part thereof and protruding farther than the back surface 220B in a direction perpendicular to the axial direction. The to-be-pressed surface 225T is formed as a gently curved surface.

The latch 200 comprises a torsion spring 228 as a second spring that biases the hook 220 from the non-engaging position toward the engaging position. In other words, the hook 220 is biased in the second direction by the torsion spring 228. An arm of the torsion spring 228 is engaged with the hook 220, and the other arm is engaged with the main frame 211.

The lock cam 240 is made by forming a metal plate. The lock cam 240 includes a bearing hole 241, a first connecting hole 242, and a second connecting hole 243, and a protrusion 244. The lock cam 240 approximately has a shape of a fan that spreads out downwards.

A hollow cylindrical shaft 249 is inserted in the bearing hole 241. The shaft 249 is fixed to the main frame 211. The lock cam 240 is supported via the shaft 249 rotatably about an axis X12. The lock cam 240 is rotatable between a lock position in which the rotation of the hook 220 is prevented (refer to FIG. 15 and FIG. 20) and an unlocked position in which the rotation of the hook 220 is not prevented (refer to FIG. 19). The lock cam 240 is biased in the first direction by a torsion spring 248A. One arm of the torsion spring 248A is engaged with the lock cam 240 and the other arm is engaged with the main frame 211. The protrusion 244 protrudes in one direction parallel to the axial direction (on a far side of the lock cam 240 FIG. 13).

The lock cam 240 has a lock surface 245 at its lower side. The lock surface 245 has a gently curved surface that approximates to a segment of a circle having a center of which coincides with the axis X12. The lock cam 240 has a contact surface 246 which is provided at an end, of the lock surface 245, facing in the first direction, and of which a radius of curvature is smaller than that of the lock surface 245.

When the hook 220 is in the engaging position (refer to FIG. 15 and FIG. 20), the lock cam 240 is in a normal state distanced from the hook 220. However, when the hook 220 rotates a predetermined amount from the engaging position toward the non-engaging position, the surface 220B of the hook 220 contacts the lock surface 245 of the lock cam 240, thereby preventing the hook 220 rotating from the engaging position to the non-engaging position.

The pressing arm 250 is elongated in the up-down direction. The pressing arm 250 has a bearing hole 251 and a pressing surface 252. The bearing hole 251 is located in one end portion of the pressing arm 250 in the lengthwise direction of the pressing arm 250. The pressing surface 252 is located at the other end portion of the pressing arm 250 in the lengthwise direction. The pressing surface 252 forms a gently curved protruding surface. The pressing surface 252 is slightly inclined relative to a circumference of a circle of which a center coincides with the axis X12. Specifically, the further in the second direction along the circumferential direction of the circle of which the center coincide with the axis X12, the farther the distance between the pressing surface 252 and the axis X12 is. The shaft 249 is inserted in the bearing hole 251. Thus, the pressing arm 250 is supported by the main frame 211 rotatably via the shaft 249. In other words, the pressing arm 250 is supported by the main frame 211 rotatably about the same axis as the axis of rotation of the lock cam 240.

The pressing arm 250 is rotatable relative to the lock cam 240. The latch 200 comprises a torsion spring 248B as a first spring that biases the pressing arm 250 in the first direction that is a direction of its rotation relative to the lock cam 240. One arm of the torsion spring 248B is engaged with the lock cam 240, and the other arm is engaged with the pressing arm 250. The torsion spring 248B biases the pressing arm 250 toward the hook 220. From this, the pressing arm 250 is pressed against the hook 220 when the hook 220 is in the engaging position (refer to FIG. 15 and FIG. 20). Specifically, the pressing surface 252 is pressed against the to-bepressed surface 225T of the sub-plate 225 by the pressing arm 250 being biased in the first direction by the torsion spring 248B.

The pressing arm 250 is located above the protrusion 244, and contact the protrusion 244 to thereby prevent the lock cam 240 from rotating further in the first direction relative to the lock cam 240. When the pressing arm 250 is in contact with the protrusion 244, the protrusion 244 and the pressing arm 250 rotates together. When the lock cam 240 moves from the lock position to the unlock position, for example, when the latch 220 changes from the state in FIG. 15 to the state in FIG. 18, the pressing arm 250 is pushed up by the protrusion 244 and rotates together with the lock cam 240, and is separated from the hook 220.

Figure 17:
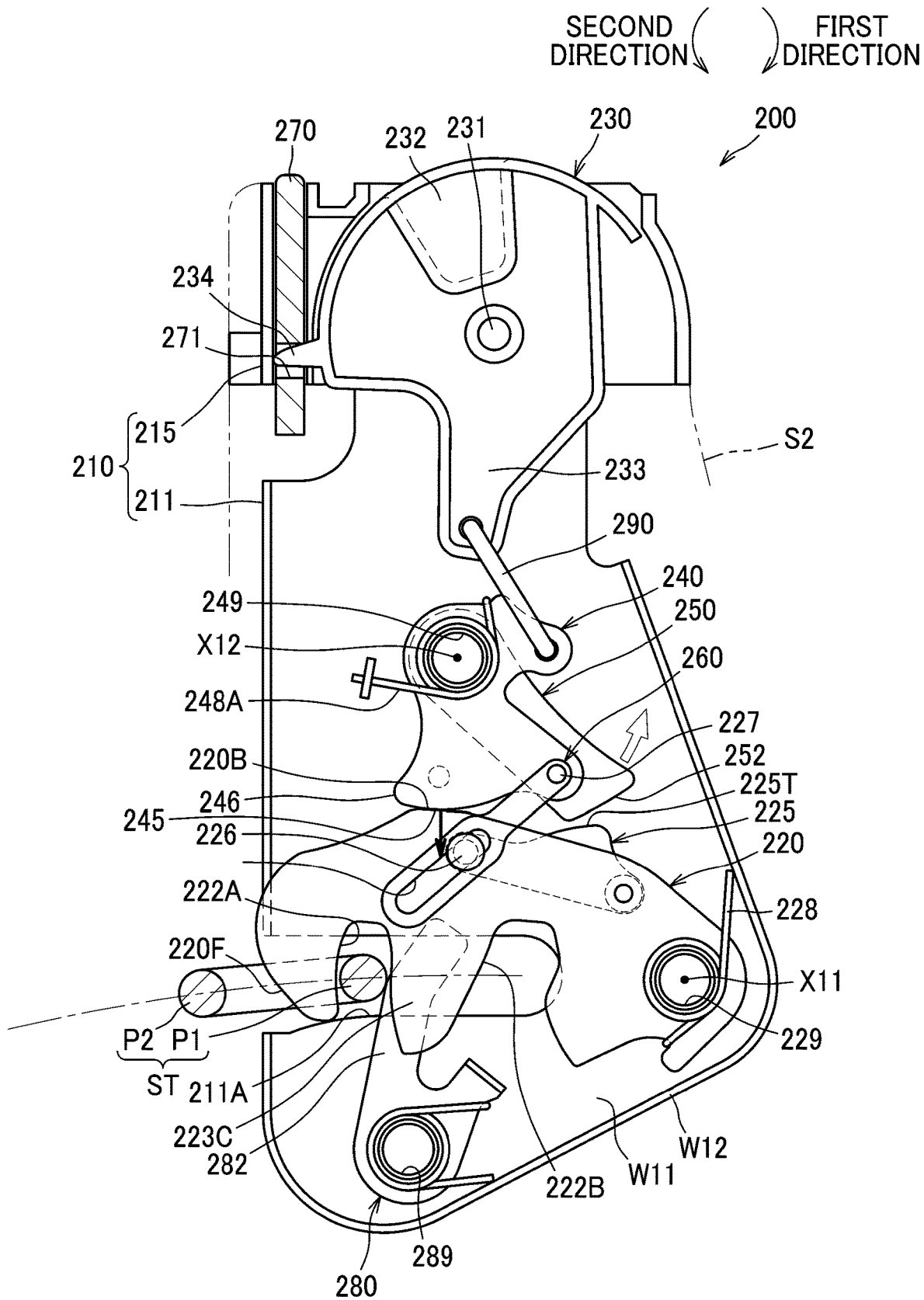
FIG. 17 is a diagram describing a state in which the hook is lifted due to the vibration of the vehicle.
Figure 18:
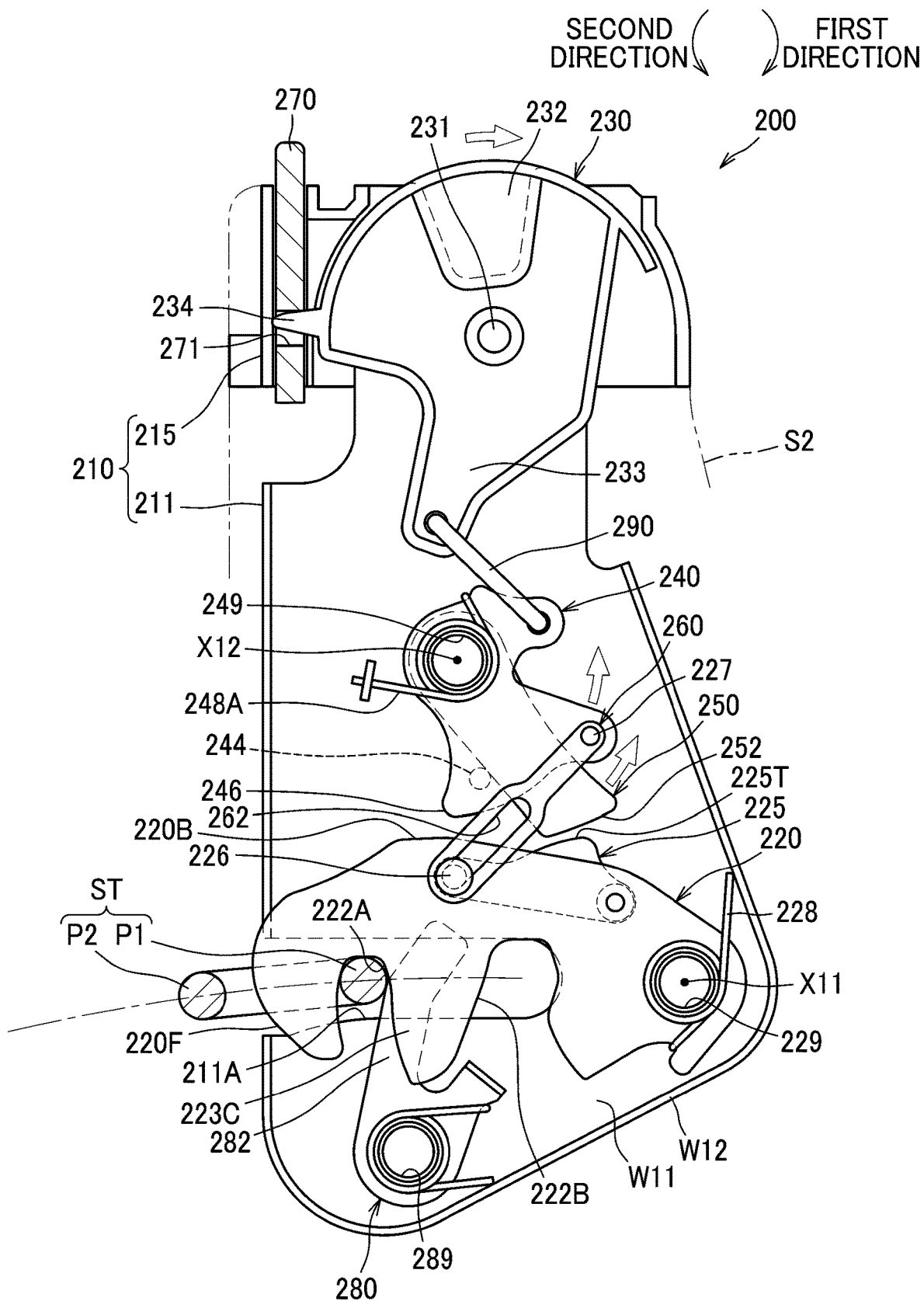
FIG. 18 is a diagram showing a pressing arm separated by the operation of the release lever according to the second embodiment.

Referring back to FIG. 12 and FIG. 13, the interlocking link 260 connects the lock cam 240 and the hook 220, which are thus rendered movable synchronously. The interlocking link 260 has an elongated shape and have a hole 261 at one end thereof and a long hole 262 at the other end thereof. The long hole 262 extends in the lengthwise direction of the interlocking link 260. A pin 269 is inserted in the hole 261. The pin 269 is fixed to the second connecting hole 243 of the lock cam 240. Thus, the interlocking link 260 is rotatable relative to the lock cam 240. The long hole 262 engages with the pin 226. Thus, the interlocking link 260 is rotatable relative to the hook 220. The interlocking link 260, as shown in FIG. 17 to FIG. 19, moves the hook 220 from the engaging position to the non-engaging position when the lock cam 240 moves from the lock position to the unlocked position.

Referring back to FIG. 12 and FIG. 13, the finger member 280 is made by forming a metal plate, and includes a bearing part 285, a first finger 282 extending from the bearing part 285, and a second finger 283 extending from the bearing part 285. The bearing part 285 has a hole 281. A hollow cylindrical shaft 289 is inserted in the hole 281. The shaft 289 is fixed to the main frame 211. The finger member 280 is thus supported by the main frame 211 rotatably via the shaft 289. The first finger 282 extends long to a position in which it crosses the receiving groove 211A. The second finger 283 is shorter than the first finger 282. The second finger 282 has a receiving part 283A bent in the axial direction at its end. The latch 200 comprises a torsion spring 288 biasing the finger member 280. The torsion spring 288 biases the finger member 280 in the second direction. One arm of the torsion spring 288 is engaged with the finger member 280, and the other arm is engaged with the main frame 211. The finger member 280 contacts a stopper (not shown) or the side wall W12, and is restrained from rotating in the second direction from the position in FIG. 12.

The first finger 282 of the finger member 280 contacts the striker ST inserted in the receiving groove 211A. The finger member 280 functions to push the striker ST out of the receiving groove 211A by the biasing force of the torsion spring 288. In other words, the finger member 280 assists the striker ST in getting detached from the latch 200. When the latch 200 is in the disengaging position as shown in FIG. 12, the receiving part 283A of the second finger 283 contacts the end part 220T of the second protrusion 223C of the hook 220. The position of the hook 220 is determined accordingly in the disengaged position.

The release lever 230 comprises a shaft 231, a holding part 232, a connecting arm 233, and a flag operating part 234.

Figure 15:
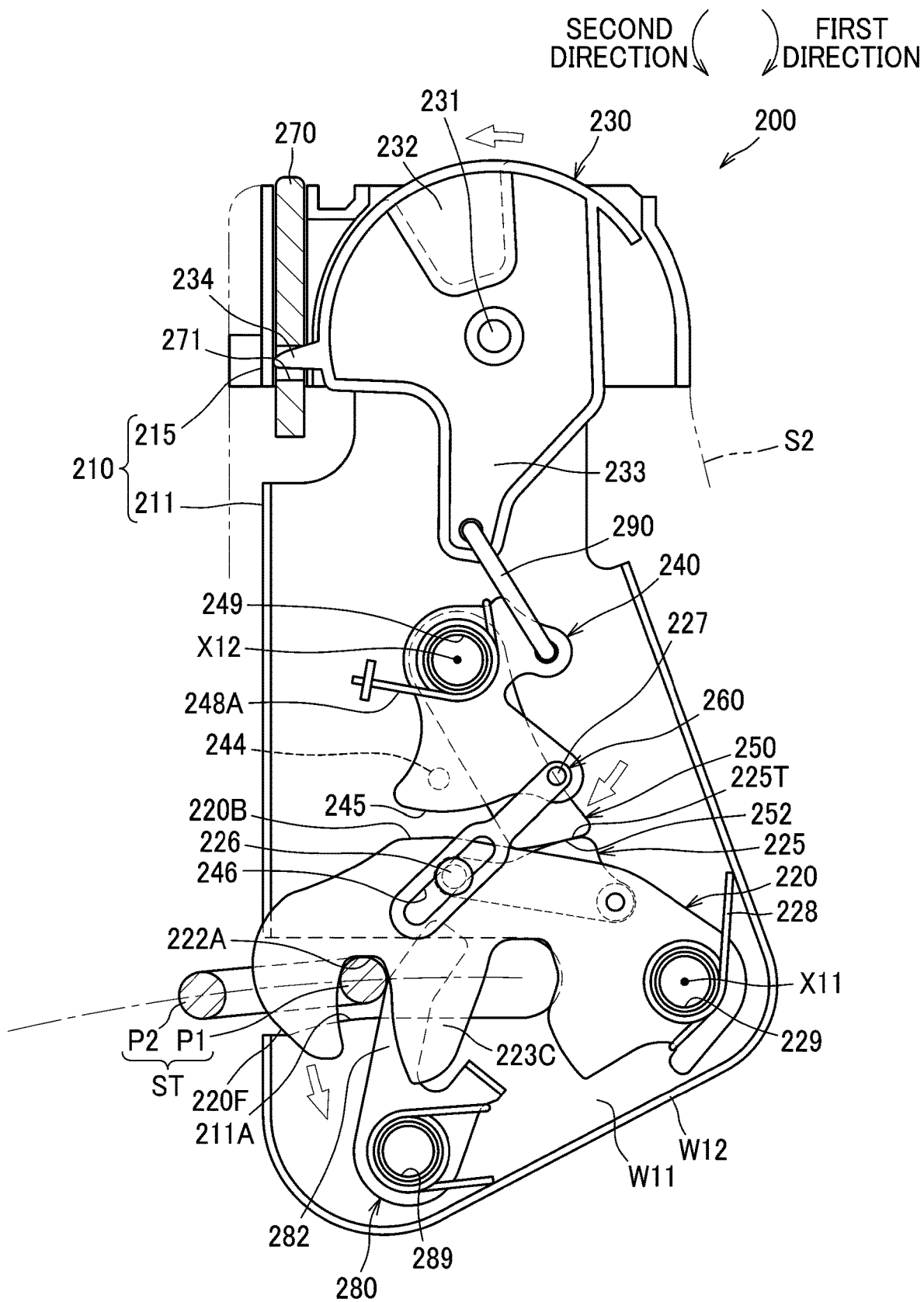
FIG. 15 is a diagram showing the latch in a first lock position according to the second embodiment.
Figure 16:
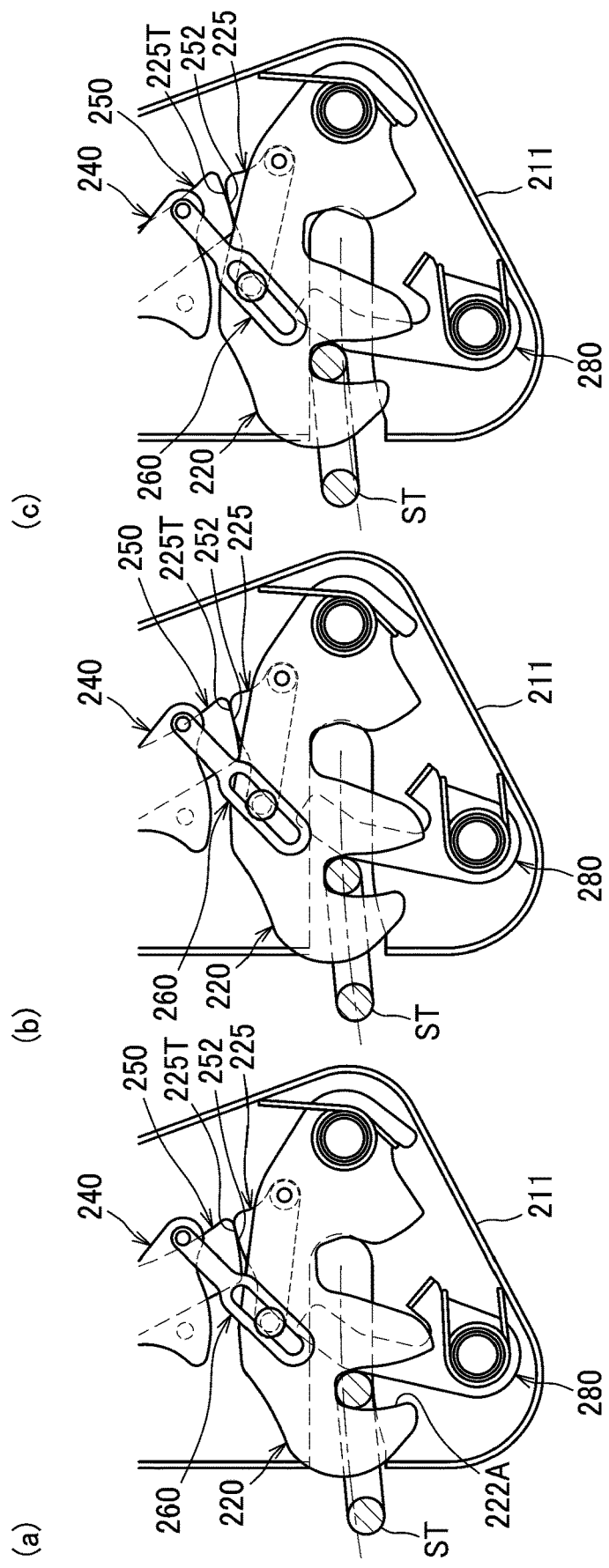
FIG. 16 includes diagrams for describing a lock state in which the position of the striker relative to the latch varies up and down according to the second embodiment.

The shaft 231 extends in the axis direction. The lever frame 215 supports the shaft 231 in a manner that allows the shaft 231 to rotate. The release lever 230 is thus rotatably supported by the lever frame 215. The latch 200 of FIG. 15 is such a state that the striker ST is engaged with the hook 220 and the release lever 230 is not operated; the position of the lever 230 at this state will be referred to as "initial position." The release lever 230 is stopped from rotating in the second direction from the initial position in FIG. 15 by a stopper not shown in the figures. In the present embodiment, a lock state refers to a state in which the striker ST is engaged with the hook 120 and the hook 220 is made unable to move to the non-engaging position (refer to FIG. 19), and an unlocked state refers to a state other than the lock state (the unlocked state includes a release position which will be described later).

The holding part 232 extends upward from the shaft 231. The holding part 232 is exposed at the upper part of the seat back S2. The connecting arm 233 extends downward from the holding part 232. The connecting arm 233 has an engaging hole 233A at its end portion. An end portion of the link 290 is rotatably connected to the engaging hole 233A. The flag operating part 234 protrudes to the rear.

The flag 270 is a member that shows to the outside that the latch 200 is in the unlocked state. The flag 270 does not protrude much from the upper surface of the lever frame 215 when the hook 220 is engaged with the striker ST and the latch 200 is thus in the lock state, as in FIG. 15 and FIG. 20. The flag 270 may not protrude from the upper surface of the lever frame 215 when the latch 200 is in the lock state. The flag 270 has an engaging hole 271. The flag operating part 234 of the release lever 230 is inserted into the engaging hole 271. When the release lever 230 rotates from the initial positon in FIG. 15 to the front of the seat S, the flag operating part 234 pushes the flag 270 upward, and the flag 270 protrude from the upper surface of the lever frame 215 (refer to FIG. 12 and FIG. 19).

The link 290 is a member formed by a wire. One end portion of the link 290 is rotatably connected to the release lever 230 as described above. The other end portion of the link 290 is rotatably connected to the first connecting hole 242 of the lock cam 240. Therefore, the latch 200 is configured such that the motion of the release lever 230 is transmitted to the lock cam 240 via the link 290 and the motion of the lock cam 240 is transmitted to the release lever 230 via the link 290.

The latch 200 is attached to the seat back S2 by inserting bolts in at least two of the shaft 229, the shaft 249, and the shaft 289 and fixing the bolts to the frame of the seat back S2.

The operation of the latch 200 configured as explained above, will be described.

When the hook 220 is detached from the striker ST and the latch 200 is in the initial position, as in FIG. 12, the end portion 220T of the hook 220 contacts the receiving part 283A of the finger member 280, and the position of the hook 220 is decided. The lock cam 240 is biased by the torsion spring 248A in the first direction and the contact surface 246 contacts the back surface 220B of the hook 220, whereby its position is determined. The release lever 230 and the interlocking link 260 are in positions in accordance with the position of the lock cam 240. The flag 270 is pushed up by the flag operating part 234, and protrudes through the upper surface of the lever frame 215 to show the latch 200 is the unlocked state.

Figure 14:
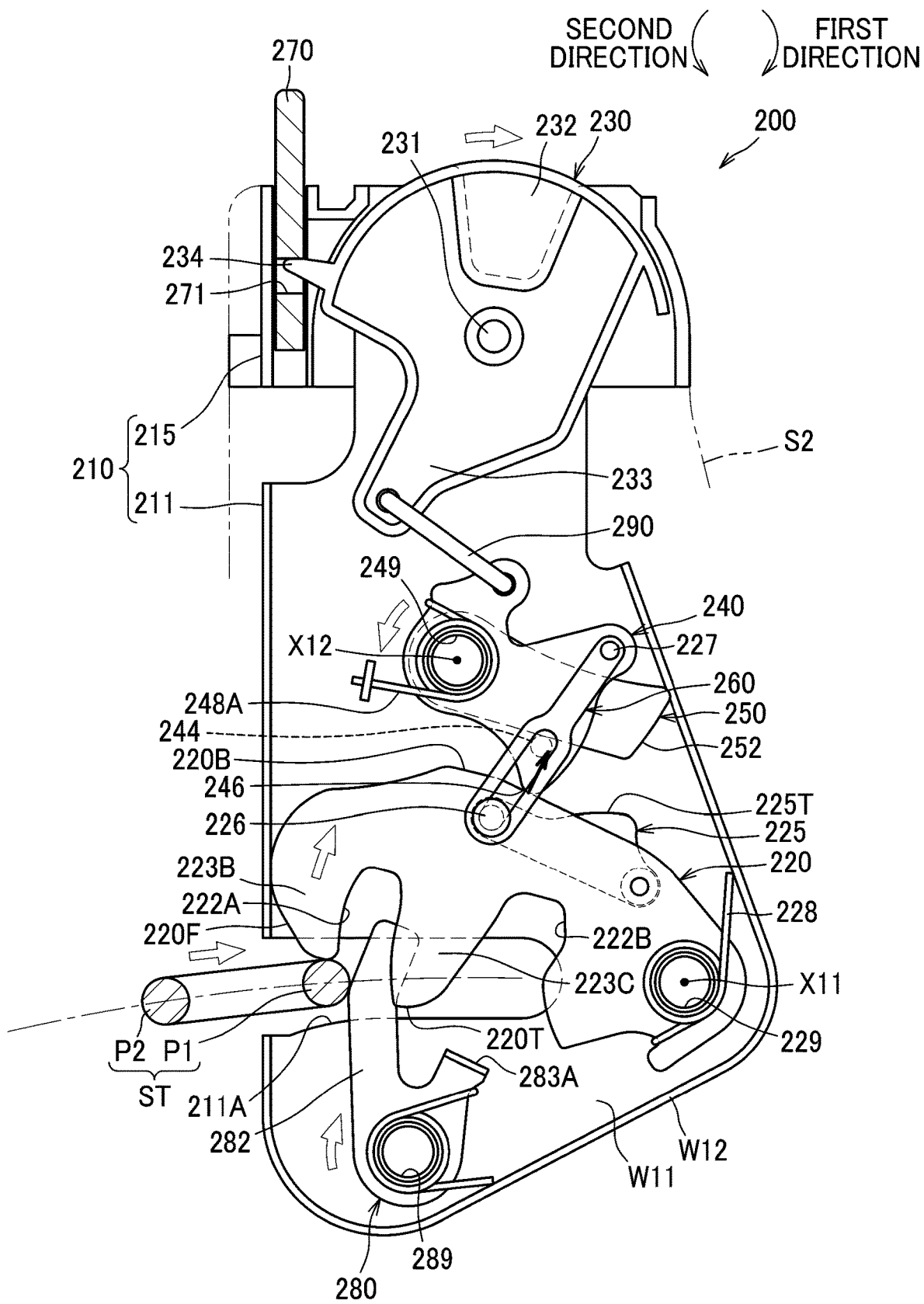
FIG. 14 is a diagram showing a state where the hook has been pushed and moved by the striker from the state in FIG. 12.

When the seat back S2 is inclined rearward from the state in FIG. 12, the striker ST contacts the inclined surface 220F of the hook 220 and pushes aside the hook 220 upward, as shown in FIG. 14. The striker ST also pushes and rotates the finger member 280 in the first direction. The lock cam 240 is caused to rotate in the second direction by the back surface 220B of the hook 220 pushing the contact surface 246 of the lock cam 240. The release lever 230 and the flag 270 moves in accordance with the movement of the lock cam 240.

When the seat back S2 is further inclined rearward from the state in FIG. 14, the striker ST is detached from the first protrusion 223B and, as shown in FIG. 15, the striker ST enters the first engaging groove 222A. The hook 220 rotates in the second direction by the biasing force of the torsion spring 228, and stops at a position in which the bottom of the first engaging groove 222A contacts the striker ST. The lock cam 240 rotates in the first direction by the biasing force of the torsion spring 248, and stops at a position in which the release lever 230 is in the initial position. The pressing arm 250 rotates in the first direction by the biasing force of the torsion spring 248B, and the pressing surface 252 contacts the to-be-pressed surface 225T. The hook 220 is locked so as to not rotate easily in the first direction by the to-be-pressed surface 225T contacting the pressing surface 252. The pressing arm 250 restrains the hook 220 from getting loosened. The latch 200 comes in the first lock position. The flag 270 is lowered and shows that the latch 200 is in the lock state. The hook 220 is separated a predetermined distance from the lock cam 240. When the latch 200 is in the first lock position, the pin P1 is made unable to move by the hook 200 in the front-rear direction, and therefore the seat back S2 is securely locked.

Here, the operation of the pressing arm 250 as effected when the relative positions of the striker ST and the latch 200 vary will be described. FIG. 16(a) to FIG. 16(c) are figures describing a state in which the position of the striker ST relative of the latch 200 varies: FIG. 16(b) shows a state when the striker ST is in a middle position, FIG. 16(a) shows a state when the striker ST is in a position shifted downward, and FIG. 16(c) shows a state when the striker ST is in a position shifted upward. In each of the cases in FIG. 16(a) to FIG. 16(c), the position of the hook 220 is determined by the bottom of the first engaging groove 222A contacting the striker ST. Since the distance from the axis X12 to the pressing surface 252 is farther at the upper part, than the lower part, of the pressing surface 252, when the striker ST is in a position shifted downwards (FIG. 16(a)), the pressing arm 250 rotates further in the first direction than when the striker ST is in the middle position (FIG. 16(b)), and contacts the to-be-pressed surface 225T. On the other hand, when the striker ST is in a position shifted upwards (FIG. 16(c)), the pressing arm 250 does not rotate farther in the first direction (relatively shifted in the second direction) than when the striker ST is in the middle position (FIG. 16(b)) and contacts the to-be-pressed surface 225T. In this manner, the pressing arm 250 autonomously closes the gap between the hook 220 and the pressing arm 250, and contacts the hook 220 according to the shift of the position of the striker ST. Therefore, the hook 220 can be restrained from shaking even if the position of the striker ST relative to the latch 200 varies due to a position error as would be introduced in installation of the striker ST and/or the latch 200.

As shown in FIG. 17, when the vehicle vibrates or is shaken largely, the pressing arm 250 and the hook 220 may be shaken due to the inertia, and the pressing arm 250 may become disengaged from the hook 220. In this instance, the lock of the hook 220 by the pressing arm 250 is released, but the back surface 220B of the hook 220 contacts the lock surface 245 of the lock cam 240, thereby preventing the hook 220 rotating from the engaging position to the non-engaging position.

When the seat back S2 is moved from the first lock position, the release lever 230 is pulled frontward and caused to rotate as shown in FIG. 18 and FIG. 19. When the release lever 230 rotates in the first direction, first, as shown in FIG. 18, the lock cam 240 rotates in the second direction and the protrusion 244 contacts the pressing arm 250, and pushes it up. The lock of the hook 220 by the pressing arm 250 is then released.

Further, as shown in FIG. 18 and FIG. 19, the pin 226 is located at the lower end of the long hole 262 of the interlocking link 260, and the hook 220 is pulled upward by the interlocking link 260, as the interlocking link 260 moves upwards. Further, when the end portion 220T of the hook 220 is disengaged from the receiving groove 211A, the hook 220 is located in the non-engaging position, and the latch 200 is in the release position. The flag 270 is raised, showing that the latch 200 is in the unlocked state. When the latch 200 is in the release position, the striker ST is freely movable inside the receiving groove 211A. If the seat back S2 with the latch 200 in the release position is inclined frontward, the latch 200 comes in the disengaged position in FIG. 12. If the seat back S2 with the latch 200 in the release position is inclined rearward to the reclining position, the striker ST is inserted into the bottom of the receiving groove 211A.

Figure 20:
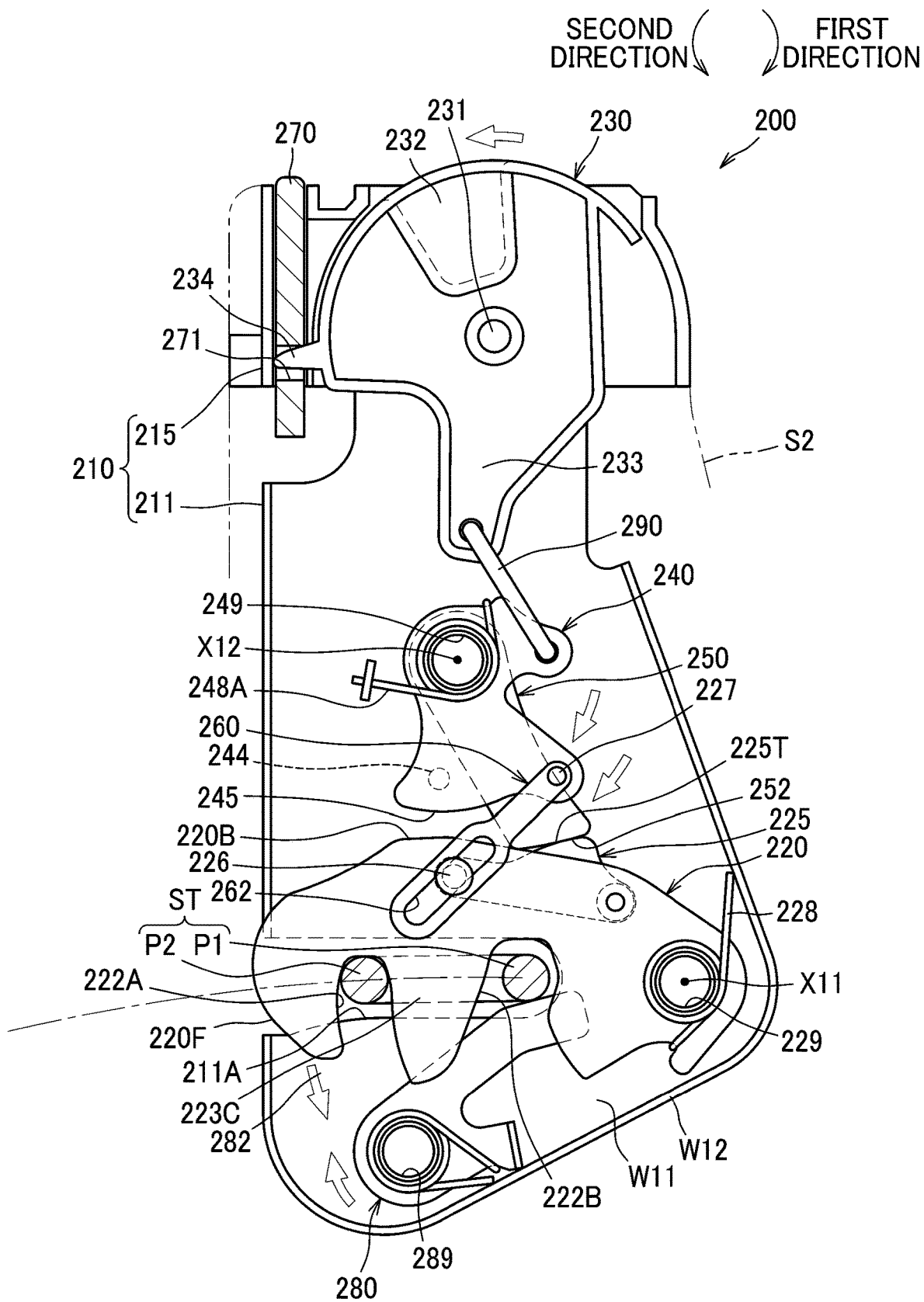
FIG. 20 is a diagram showing a latch in the second lock position according to the second embodiment.

As shown in FIG. 20, if the release lever 203 is released when the seat back S2 is in the reclining position, the hook 220 is caused to rotate in the second direction by the torsion spring 228, and the second pin P2 contacts the bottom of the first engaging groove 222A. The first pin P1 enters the second engaging groove 222B. Then, similarly to the situation in the first lock position, the lock cam 240 is caused to rotate in the first direction by the biasing force of the torsion spring 248A, and stops at a position in which the release lever 203 is in the initial position. The pressing arm 250 is caused to rotate in the first direction by the biasing force of the torsion spring 248B, and the pressing surface 252 contacts the to-be-pressed surface 225T. The hook 220 is locked so as not to rotate easily in the first direction by the to-be-pressed surface 225T contacting the pressing surface 252. The hook 220 is restrained from getting loosened the pressing arm 250. The latch 200 comes in the second lock position. The flag 270 is lowered, showing that the latch 200 is in the lock state. The hook 220 is separated a predetermined distance from the lock cam 240. When the latch 200 is in the second lock position, the pin P2 is restrained from moving in the front-rear direction, and therefore the seat back S2 is securely locked. When the latch 200 is in the second lock position, similar to the case in which the latch 200 is in the first lock position, the pressing arm 250 restrains the hook 220 from shaking irrespective of variations in the position of the striker ST.

When the seat back S2 is moved from the second lock position, the release lever 230 is pulled frontward and caused to rotate, and, the hook 220 is positioned in the non-engaging position as in FIG. 19, and the latch 200 in the release position, the seat back S2 can be moved frontward and backward freely.

According to the above, the following advantageous effects can be achieved in the second embodiment.

When the latch 200 is in the first lock position or the second lock position, a predetermined amount of rotation of the hook 220 from the engaging position toward the non-engaging position causes the lock cam 240 to contact the hook 220, and the lock is restrained from getting released. When the hook 220 is in the engaging position, the pressing arm 250 is pressed against the hook 220 so that the hook 220 can be restrained from getting loosened. Therefore, shaking of the hook 220 shaking due to the vibration of the vehicle or the like can be restrained. The hook 220 can be restrained from shaking even if the position of the striker ST relative to the latch 200 varies due to a position error as would be introduced in installation of the striker ST and/or the latch 200 can also be restrained.

Since the latch 200 comprises the torsion spring 248B, it can be ensured that the pressing arm 250 is pressed against the hook 220.

Since the latch 200 comprises the interlocking link 260, the hook 220 can be moved from the engaging position to the non-engaging position by moving the lock cam 240 from the lock position to the unlocked position.

The embodiments of the present disclosure are described above, but the latch 100 and 200 of respective embodiments may be modified as appropriate when implemented.

For example, the second embodiment may not have any first spring. Gravity can be used instead of the first spring, and, for example, a weight can be used to bias the pressing arm to the hook.

The to-be-pressed surface 225T is provided on the sub-plate 225 in the second embodiment, but there may be no sub-plate 225. The hook 220 can be formed such that the to-be-pressed surface is provided in one member.

The elements described in each of the above-described embodiments may be implemented selectively and in combination where appropriate.

The invention claimed is:

1. A latch for locking a seat back in two positions consisting of a raised position and a reclining position in which the seat back is inclined rearward further than in the raised position, the latch comprising:
    a frame having a receiving groove in which a striker is receivable; and
    a hook rotatably supported by the frame, the hook having an engaging groove with which the striker is engagable,
        wherein the engaging groove is a single groove consisting of a first groove part extending from a part of an outer edge of the hook and a second groove part bent from the first groove part and extending in a direction different from a direction in which the first groove part extends,
        wherein when the seat back is in the raised position, the hook is located in a first position and the striker is located in the first groove part, and when the seat back is in the reclining position, the hook is located in a second position that is a position of the hook rotated in a first direction from the first position and the striker is located in the second groove part, and
        wherein the second groove part is closer, than the first groove part, to a center of rotation of the hook.

2. A latch for locking a seat back in two positions consisting of a raised position and a reclining position in which the seat back is inclined rearward further than in the raised position, the latch comprising:
    a frame having a receiving groove in which a striker is receivable;
    a hook rotatably supported by the frame, the hook having an engaging groove with which the striker is engageable; and
    a shaft that connects the hook to the frame in such a manner that the hook is rotatable,
        wherein the engaging groove is a single groove consisting of a first groove part extending from a part of an outer edge of the hook and a second groove part bent from the first groove part and extending in a direction different from a direction in which the first groove part extends,
        wherein when the seat back is in the raised position, the hook is located in a first position and the striker is located in the first groove part, and when the seat back is in the reclining position, the hook is located in a second position that is a position of the hook rotated in a first direction from the first position and the striker is located in the second groove part, and
        wherein the shaft is shifted relative to the receiving groove in one direction that is a direction perpendicular to a direction in which the receiving groove extends.

3. A latch for locking a seat back in two positions consisting of a raised position and a reclining position in which the seat back is inclined rearward further than in the raised position, the latch comprising:
    a frame having a receiving groove in which a striker is receivable;
    a hook rotatably supported by the frame, the hook having an engaging groove with which the striker is engageable; and
    a lock member that prevents rotation of the hook located in the first position,
        wherein the engaging groove is a single groove consisting of a first groove part extending from a part of an outer edge of the hook and a second groove part bent from the first groove part and extending in a direction different from a direction in which the first groove part extends,
        wherein when the seat back is in the raised position, the hook is located in a first position and the striker is located in the first groove part, and when the seat back is in the reclining position, the hook is located in a second position that is a position of the hook rotated in a first direction from the first position and the striker is located in the second groove part, and
        wherein the lock member includes a first lock cam rotatably supported by the frame and preventing a rotation of the hook in a second direction opposite to the first direction and a second lock cam rotatably supported by the frame and preventing a rotation of the hook in the first direction.

4. The latch according to claim 3, wherein the hook is movable to an open position that is a position of the hook rotated from the first position in the second direction, and wherein the first lock cam includes a contact portion that contacts the hook in the open position and prevents the rotation of the hook in the first direction.

5. The latch according to claim 3, wherein the first lock cam prevents the hook located in the second position from rotating in the second direction.

6. The latch according to claim 3, further comprising an interlocking link that synchronizes rotation of the first lock cam and rotation of the second lock cam, wherein the interlocking link is rotatable coaxially about a same axis as an axis of rotation of the first lock cam, and connected to the second lock cam.

* * * * *